United States Patent
Foster et al.

(10) Patent No.: US 10,160,605 B1
(45) Date of Patent: Dec. 25, 2018

(54) OSCILLATING AUGER SUPPORT

(71) Applicant: Laidig Systems, Inc., Mishawaka, IN (US)

(72) Inventors: Matthew James Foster, Mishawaka, IN (US); Thomas Walter Lindenman, South Bend, IN (US); Ryan Adam Williams, North Liberty, IN (US); Jeffery Scott Underly, Granger, IN (US); Michael Ryan Genovese, South Bend, IN (US)

( * ) Notice: Subject to any disclaimer, the term of this patent is extended or adjusted under 35 U.S.C. 154(b) by 0 days.

(21) Appl. No.: 15/903,983

(22) Filed: Feb. 23, 2018

(51) Int. Cl.
*B65G 33/26* (2006.01)
*B65G 33/32* (2006.01)
*B65G 33/10* (2006.01)

(52) U.S. Cl.
CPC .......... *B65G 33/265* (2013.01); *B65G 33/10* (2013.01); *B65G 33/32* (2013.01)

(58) Field of Classification Search
CPC .............................. B65G 33/32; B65G 33/30
USPC ........................................ 198/666, 672, 673
See application file for complete search history.

(56) References Cited

U.S. PATENT DOCUMENTS

| | | | | |
|---|---|---|---|---|
| 2,480,419 | A * | 8/1949 | Patterson | A01B 9/003 198/676 |
| 4,583,903 | A * | 4/1986 | Hutchison | B65G 65/466 198/676 |
| 4,824,312 | A | 4/1989 | Schlitz | |
| 5,443,588 | A * | 8/1995 | Loppoli | A01C 3/063 198/662 |
| 5,611,290 | A * | 3/1997 | Tratz | B65G 33/24 198/671 |
| 6,254,329 | B1 | 7/2001 | Sukup et al. | |
| 7,234,909 | B2 | 6/2007 | Jonkka | |
| 7,419,048 | B2 * | 9/2008 | Weiand | A01D 61/004 198/662 |
| 8,177,470 | B2 | 5/2012 | Amick et al. | |
| 8,616,823 | B1 | 12/2013 | Hoogestraat | |
| 8,770,388 | B1 | 7/2014 | Chaon et al. | |
| 9,156,622 | B1 | 10/2015 | Chaon et al. | |

* cited by examiner

*Primary Examiner* — James R Bidwell
(74) *Attorney, Agent, or Firm* — Botkin & Hall, LLP

(57) ABSTRACT

An auger system has oscillating auger supports. The auger moves through a pile of stored material to move material from one location to another. The auger support may be a hanger that shuttles along the central axis of the auger as the auger rotates. A bearing shaft has cam followers that contact an angled surface on the bearing to slide the bearing back and forth along said central axis when said auger rotates. An alternate support may be a support wheel that rotates about an angled shaft that causes the contact surface of the support wheel to move back and forth with respect to the central axis as the auger rotates. The angled shaft may adjust the amount of oscillation. The oscillating motion of the auger support in combination with synchronized cutters on the auger allows material to be removed from the path of the advancing auger support.

20 Claims, 23 Drawing Sheets

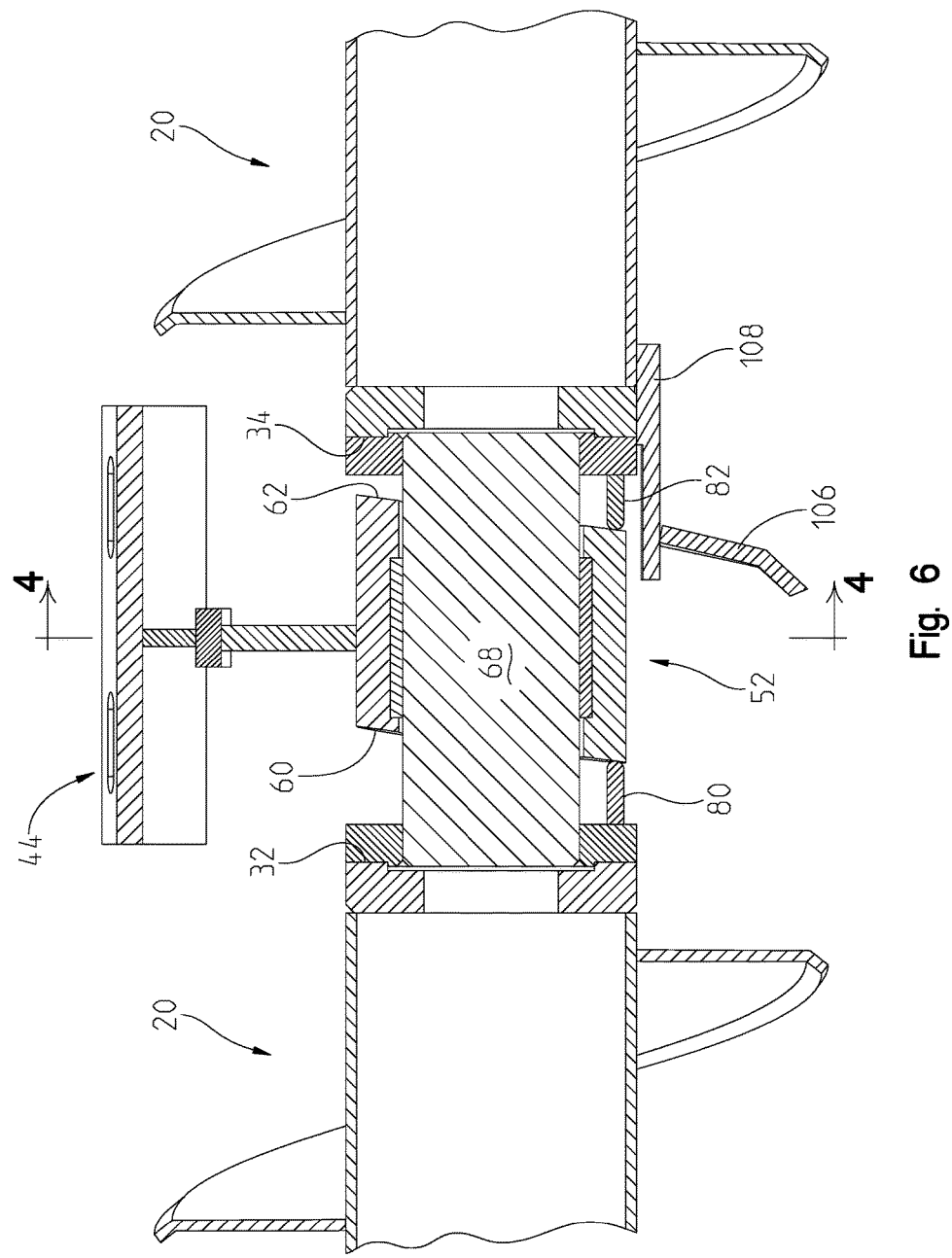

OSCILLATING AUGER SUPPORT

BACKGROUND OF THE INVENTION

This present disclosure relates to bottom unloading auger systems used to convey or unload material stored in an open pile or in silos, bins, domes, buildings, or other storage structures. This material is typically a bulk solid with flowable, semi-flowable, or poor flow characteristics. The storage structures are often cylindrical silos with either flat or conical floors, but can also be hemispherical domes or rectangular buildings. The material is typically loaded into the storage structure from the top and unloaded from the bottom. The bottom unloading auger systems are usually positioned under the pile of material to be conveyed or unloaded, or adjacent to the bottom of the pile.

Typical bottom unloading auger systems consist of an auger that is either covered with stored material, or is positioned adjacent to the bottom of a pile of stored material. The auger rotates about its linear axis in order to convey material to one end of the auger and then into in a secondary conveying device. While the auger is rotating about its linear axis it is also advancing into the pile of material. There are two basic types of bottom unloading auger systems: 1) augers that move linearly through a pile of material, conveying the stored material to a secondary conveyor outside the pile, and 2) augers that rotate in circular fashion through the pile, conveying the stored material to the center point and into a secondary conveyor. Such augers can be used to move piles of material located within various storage vessels (such as buildings, tanks, silos, or domes) or they can be used to move material stored in "open piles" that are not inside any storage building. As the amount of stored material increases (that is, with larger diameter and/or taller storage vessels, or with larger open piles), the various loads that the auger and its mechanical drive system experiences also increase. As a result, longer augers need to be supported at the end and sometimes at intermediate points as well. Augers can be supported either from below by using a wheel that rests on the floor or from above by a hanger attached to a rigid structure located above the auger. The auger support (whether a wheel or a hanger) must then push though the pile of material ahead of it, as the auger advances into the material pile. The auger support introduces a problem since it becomes a section of the auger system that is not actively cutting or conveying the pile of material. This can result in high resistance which impedes the ability of the auger system to advance into the material pile. A small obstruction, especially in dense or compacted materials, can create a substantial increase in the loads experienced by the auger system. Designing for such loads would increase the cost of the system tremendously and therefore challenge the feasibility of the auger system. Additionally, this obstruction can reduce or prevent material flow rendering the auger system ineffective. Furthermore an obstruction or blockage would require personnel entry into the storage area where high piles of material create substantial safety concerns. It is therefore important to reduce, as much as possible, the resistive loads seen by the auger support (wheel or hanger). It is helpful to design the auger support to be as narrow as possible, and to locate cutting blades or stimulation tabs as close as possible to both sides of the auger support in order to help cut or loosen the adjacent material. However these measures cannot effectively cut or loosen the material that is immediately in front of the auger support. Thus, the high resistive loads impeding auger advancement have remained a significant problem. An improved auger support system is needed.

SUMMARY OF THE INVENTION

An oscillating auger support has been invented for the purpose of significantly reducing the resistive loads normally which normally impede auger advancement. This oscillating auger support has proven that the oscillating mechanism in combination with cutters will cut, loosen, and remove the material immediately in front of the auger support, thereby greatly reducing the resistive loads encountered by the advancing auger and auger support. An oscillating auger support hanger and two types of oscillating auger support wheels have been designed. One type of oscillating auger support wheel supports an auger system at the connection point of two component augers, while the other type of oscillating auger support wheel is used to support the end of the auger system. All oscillating auger supports utilize off-axis angled plates or shafts to produce an oscillation, which when combined with synchronized cutters, result in the cutting, loosening, and removal of the highly compacted material located in front of the auger support.

In the case of an oscillating auger support hanger, off-axis angled plates are used. Those plates may be surfaces on a cam that selectively move the auger support. The movement of the auger support by using surfaces on a cam allows cutters to loosen and remove material immediately in front of the support. As the auger turns, the location where the material is loosened immediately ahead of the support changes. The angled surfaces on the cam oscillate the support in coordination with the cutters to locate the support where the cutters most effectively loosen the material immediately ahead of the support.

The oscillating auger support may be a support wheel, cutter blades, an auger bearing, and an angled auger mount. The significant innovation in this oscillating auger support wheel is the incorporation of the angled auger mount, which is an off-axis mounting arrangement resulting in the support wheel and cutter blades being mounted at a small angle (typically between 1 and 5 degrees) to the plane perpendicular to the axis of the auger. As the auger rotates, the off-axis mounting results in a side-to-side oscillating motion of the support wheel and cutting blades, which moves the rotating cutter blades back and forth across the entire area in front of the support wheel. A synchronized cutter is positioned on the auger at or near the location where the support wheel is at its maximum point of oscillation (most distant from the auger), so that the synchronized cutter blade cuts as near as possible to the support wheel when at its point of maximum oscillation.

The support wheel or bearing oscillates back and forth in a side-to-side motion while simultaneously the cutter blades and the synchronized cutter are rotating with the auger. These motions both cut and clear the path of material in front of the support wheel. The rotation of the cutter blades and the synchronized cutter will cut and/or loosen the material while the side-to-side movement of the support wheel pushes the loosened material into the conveying path of the auger which removes it from the area. As a result, when the auger drive system advances the auger into the material pile, the auger support wheel is free to move forward with minimal resistance since the material immediately in front of it has been loosened and removed.

BRIEF DESCRIPTION OF THE DRAWINGS

A preferred embodiment of this invention has been chosen wherein:

FIG. 6 is a section view 6-6 of the auger in FIG. 4;

DESCRIPTION OF THE PREFERRED EMBODIMENT

Figure 1:
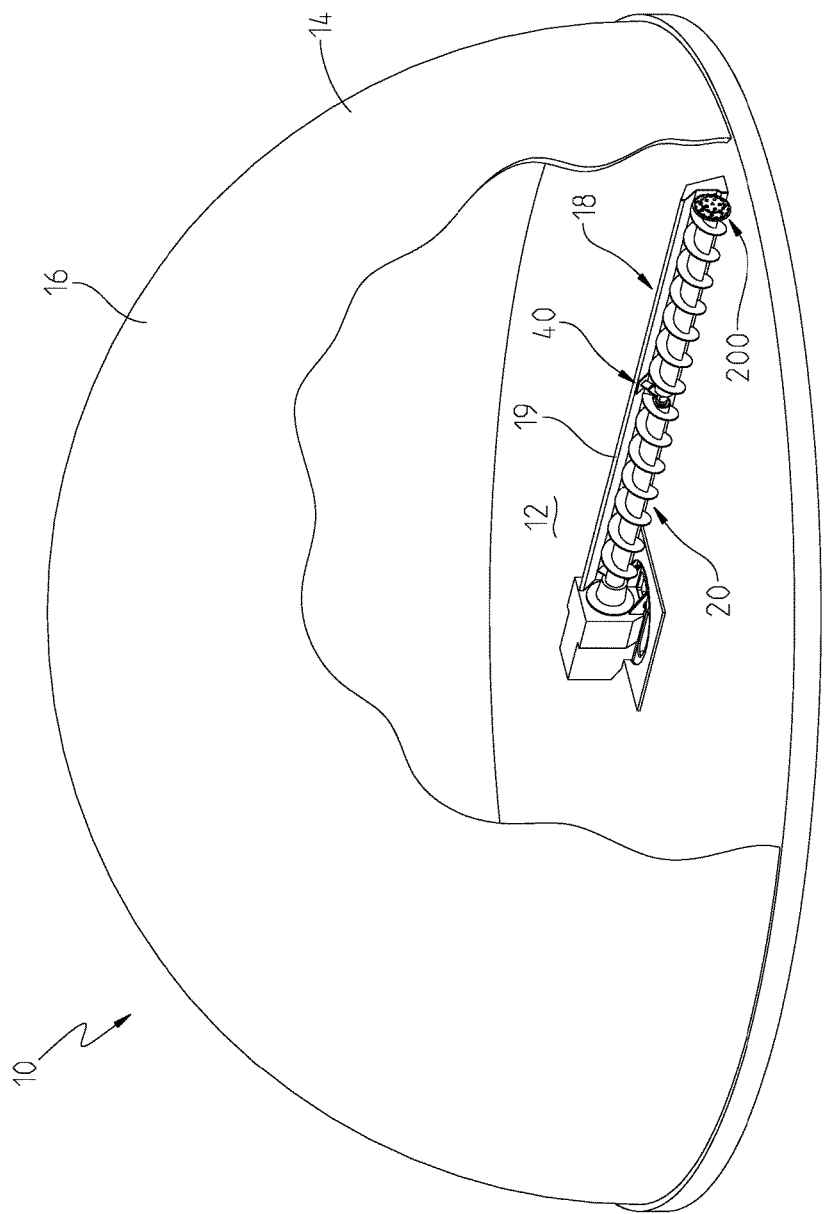
FIG. 1 is an overall isometric view of a circular storage structure with an auger that rotates about the center of the storage structure.

A storage structure 10 is shown in FIG. 1 has a floor 12, side walls 14, and a roof 16. The storage structure 10 further includes an auger 20 that sweeps over the floor 12 to move any material out of the storage structure 10. For cylindrical or hemispherical storage structures (such as silos, bins, or domes) or for material stored in an open pile, the auger assembly 18 sweeps around the floor 12 about a center pivot. For rectangular storage structures, the auger assembly 18 sweeps across the floor 12 in a linear motion. The auger assembly 18 may include a support frame 19 that supports the auger assembly 18 from above. Support frames are well-known in the art. While FIG. 1 shows an enclosed storage structure 10, it is contemplated that the embodiments shown herein are used in an open area with a floor 12, or a storage structure that only has side walls 14.

Figure 2:
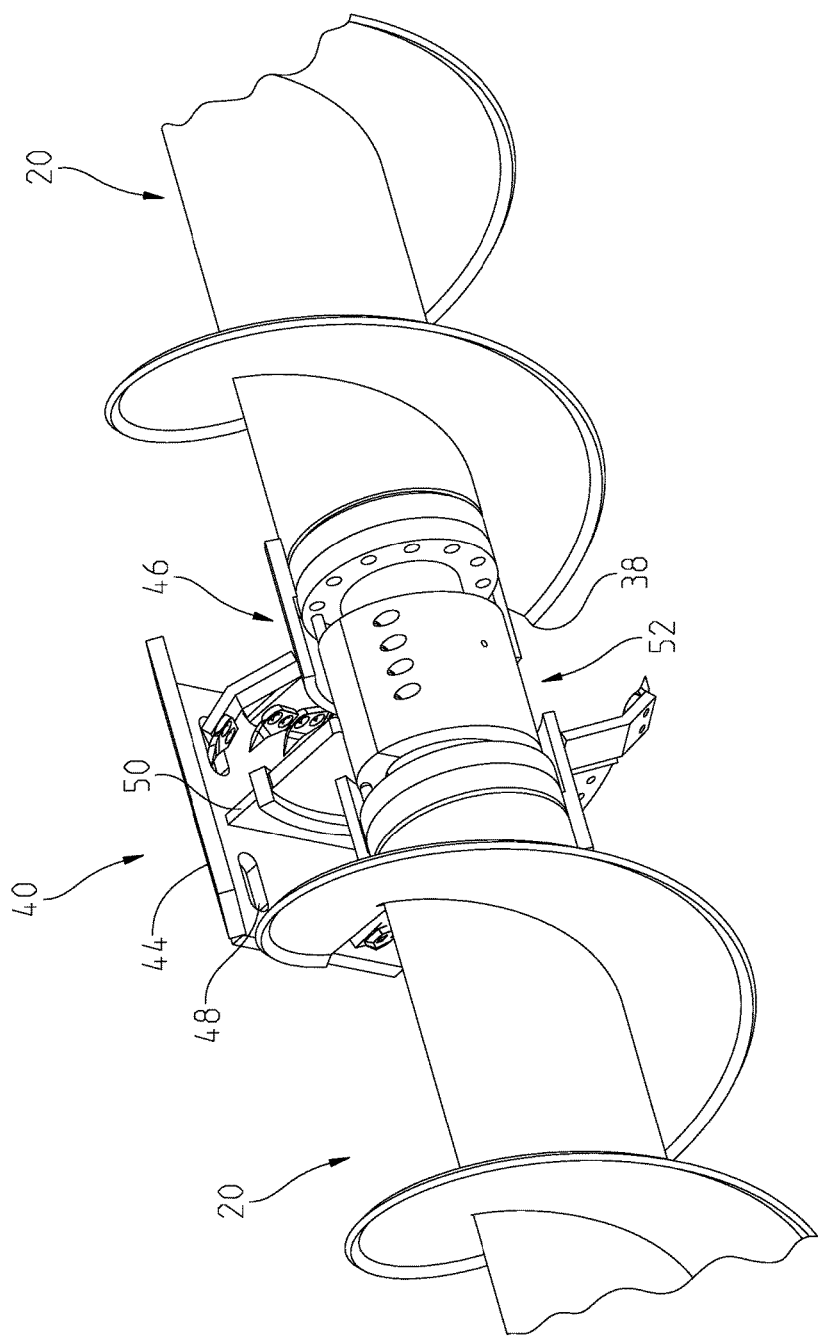
FIG. 2 is an isometric view of an auger using an oscillating auger support hanger.
Figure 3:
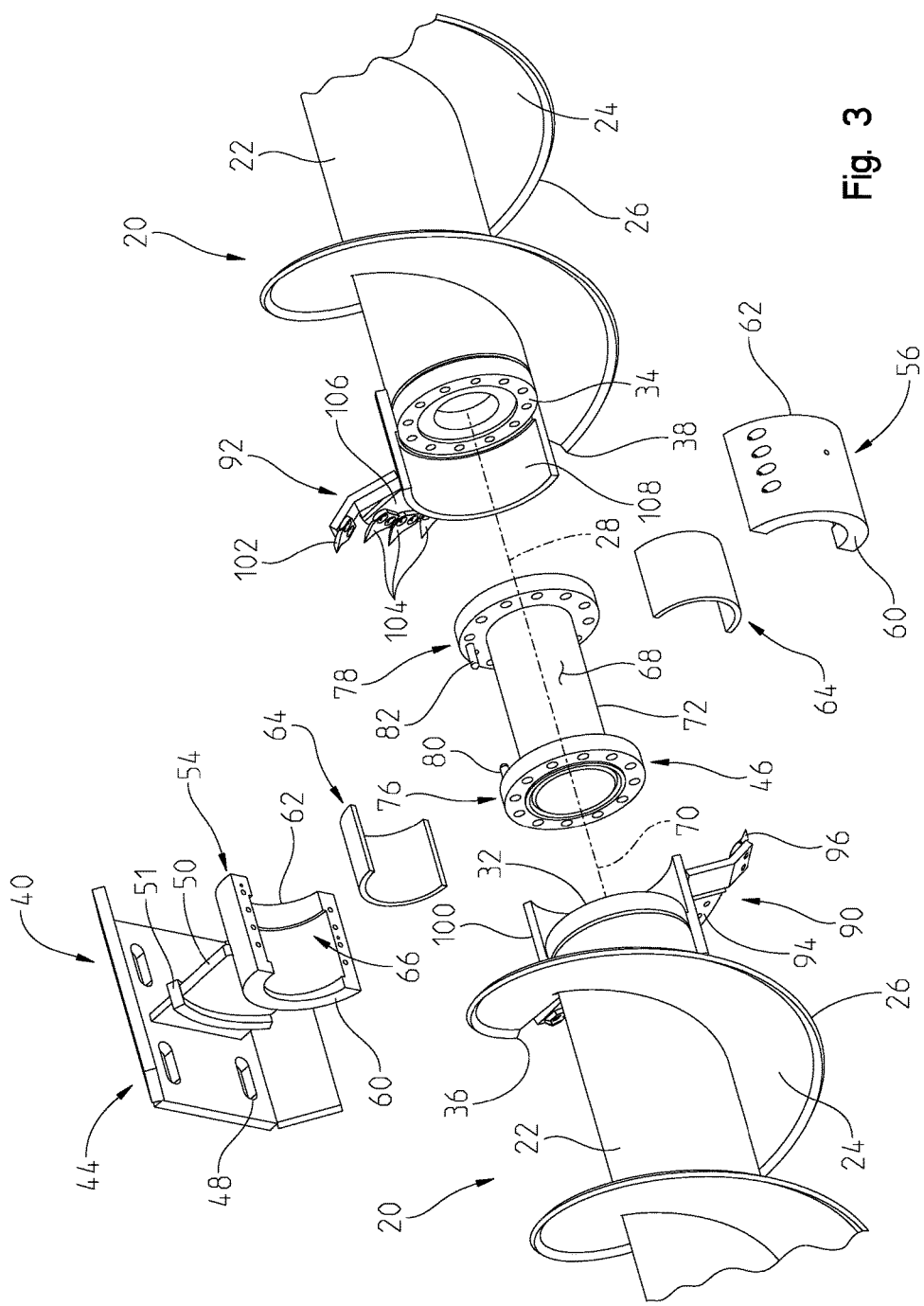
FIG. 3 is an isometric exploded view of the auger in FIG. 2.
Figure 4:
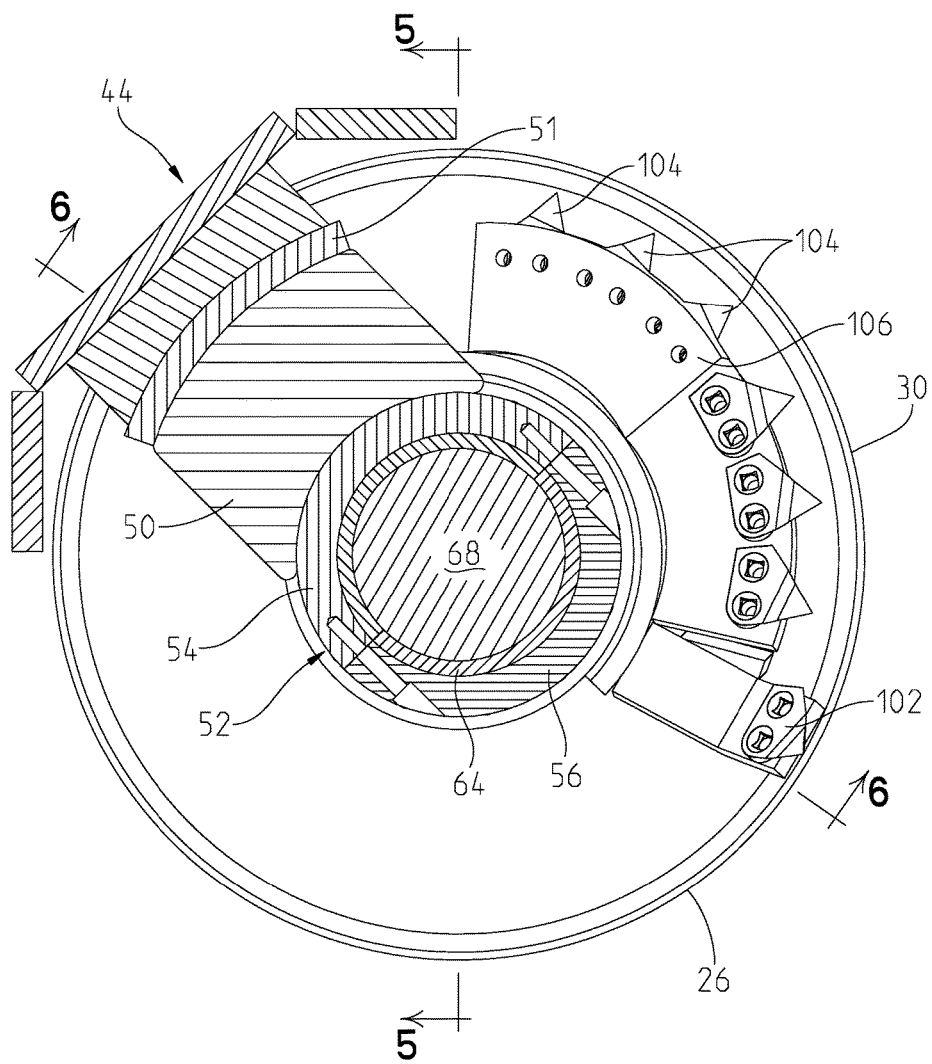
FIG. 4 is an end view of the auger in FIG. 2.
Figure 8:
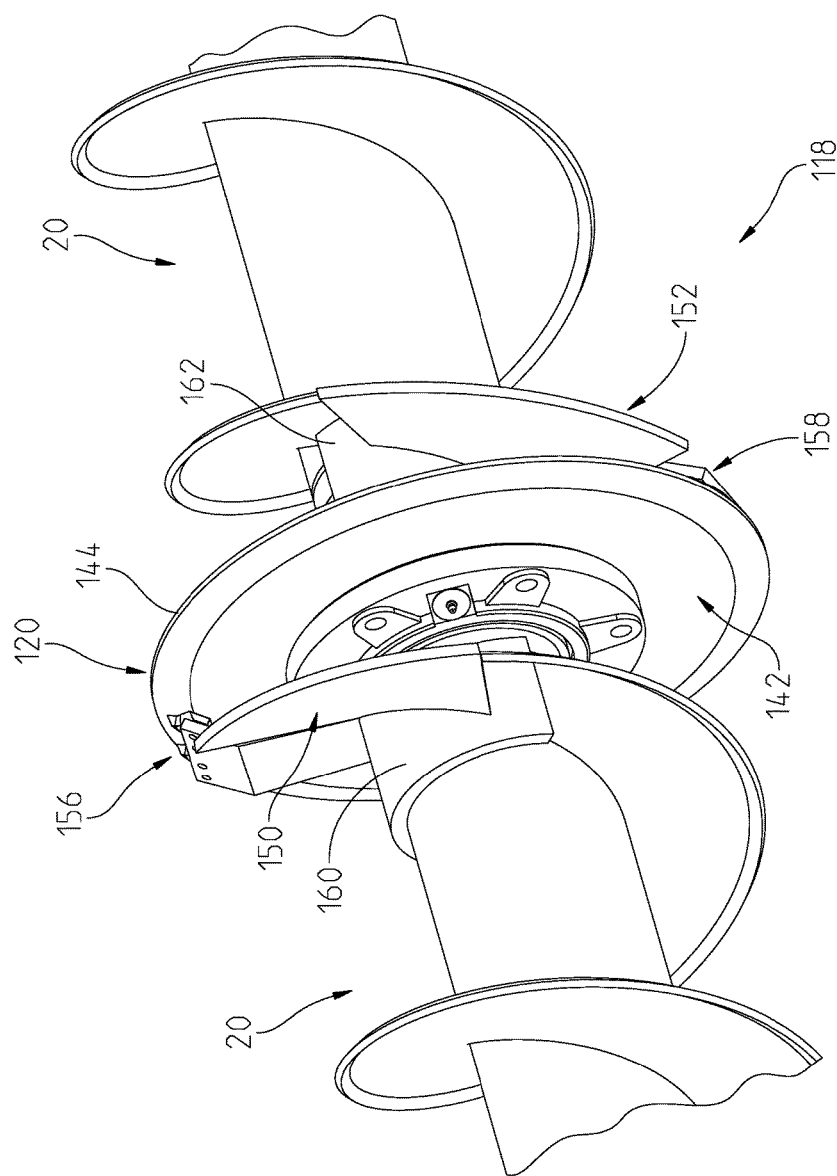
FIG. 8 is an isometric view of an auger using an oscillating mid-auger support wheel.
Figure 9:
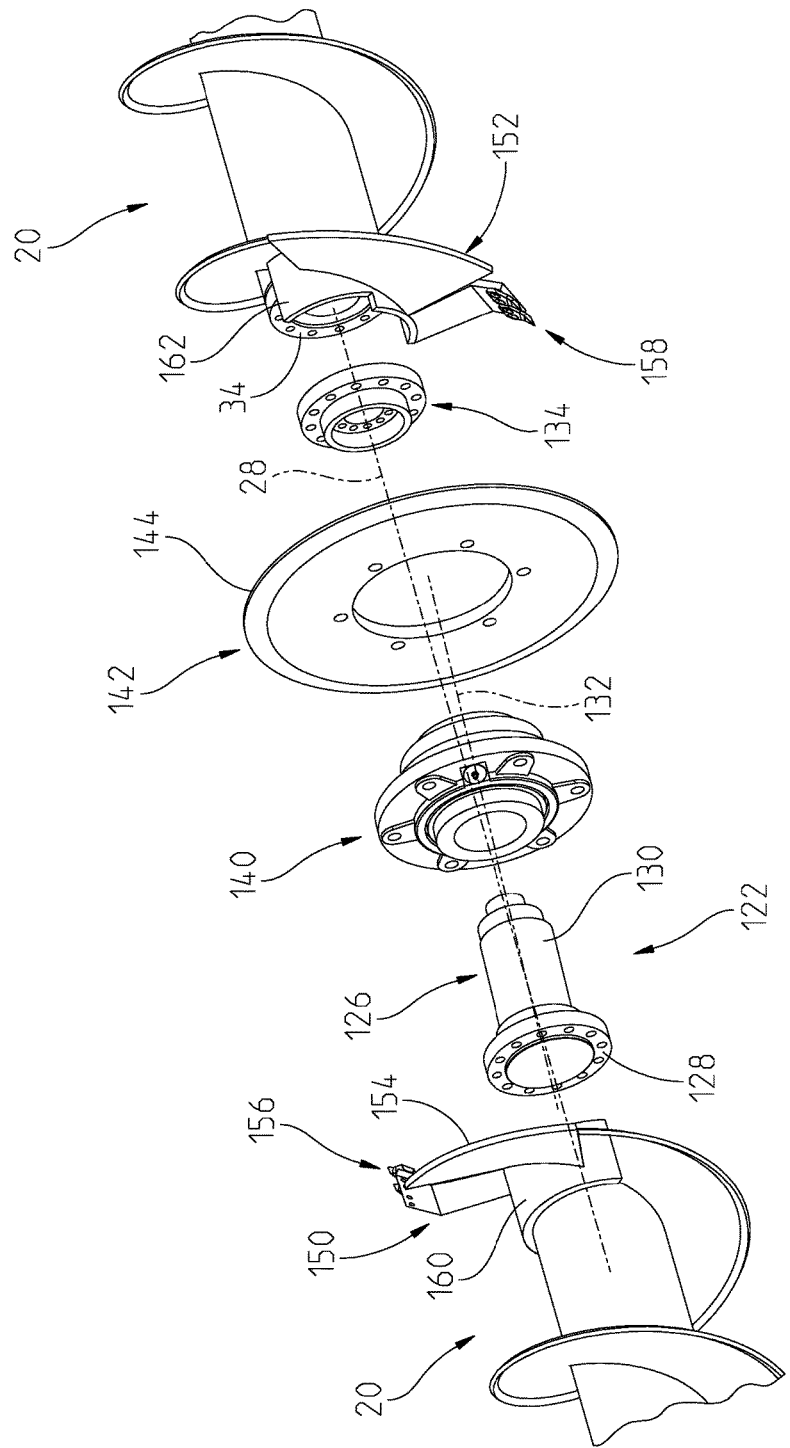
FIG. 9 is an isometric exploded view of the auger in FIG. 8.
Figure 10:
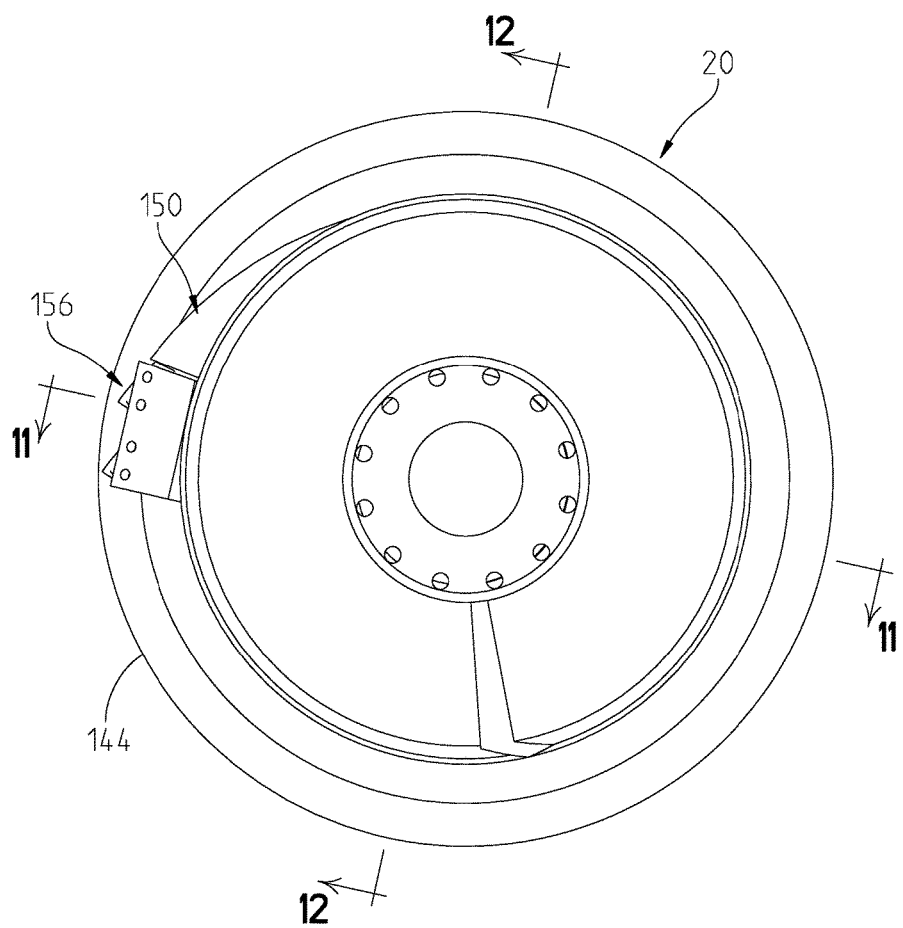
FIG. 10 is an end view of the auger in FIG. 8.
Figure 11:
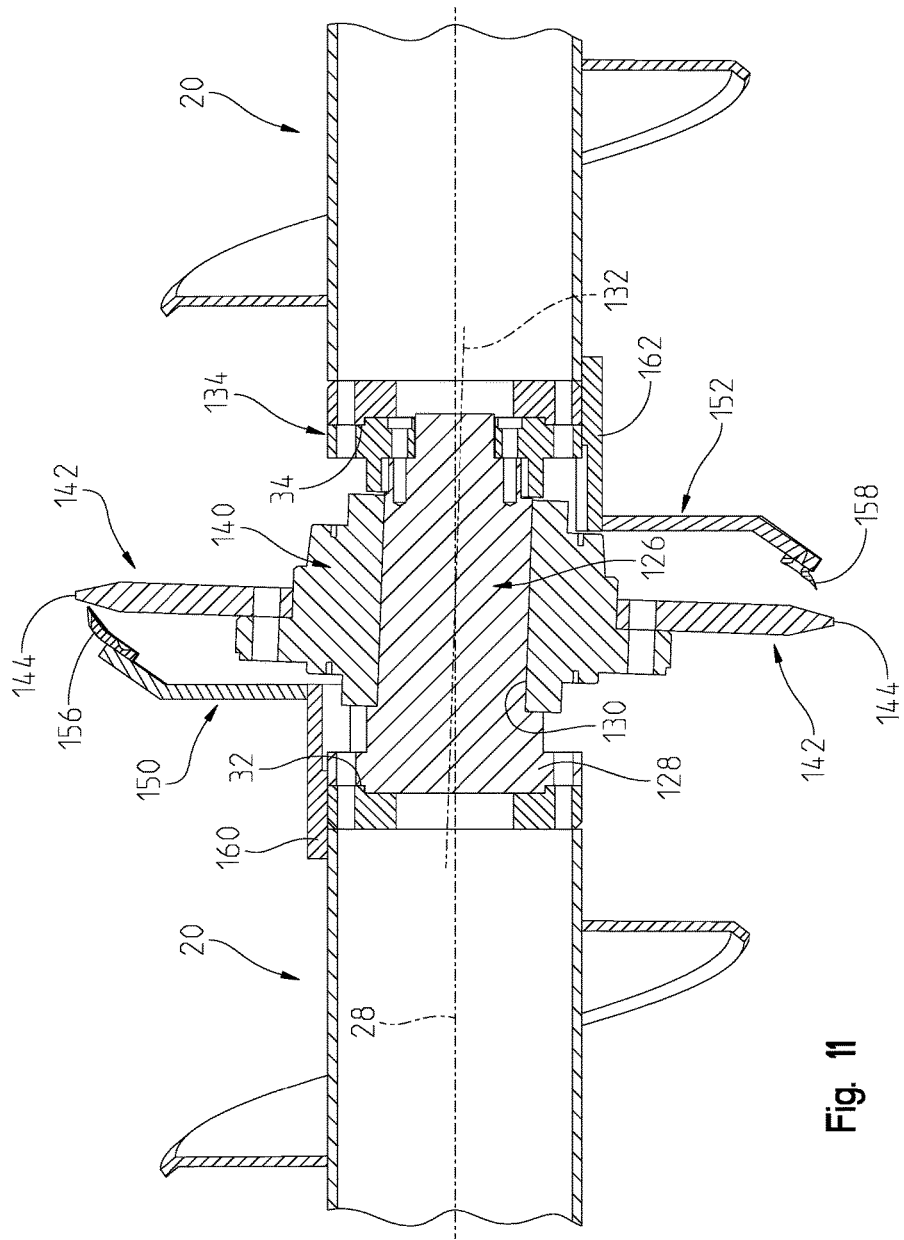
FIG. 11 is a section view 11-11 of the auger in FIG. 10.
Figure 12:
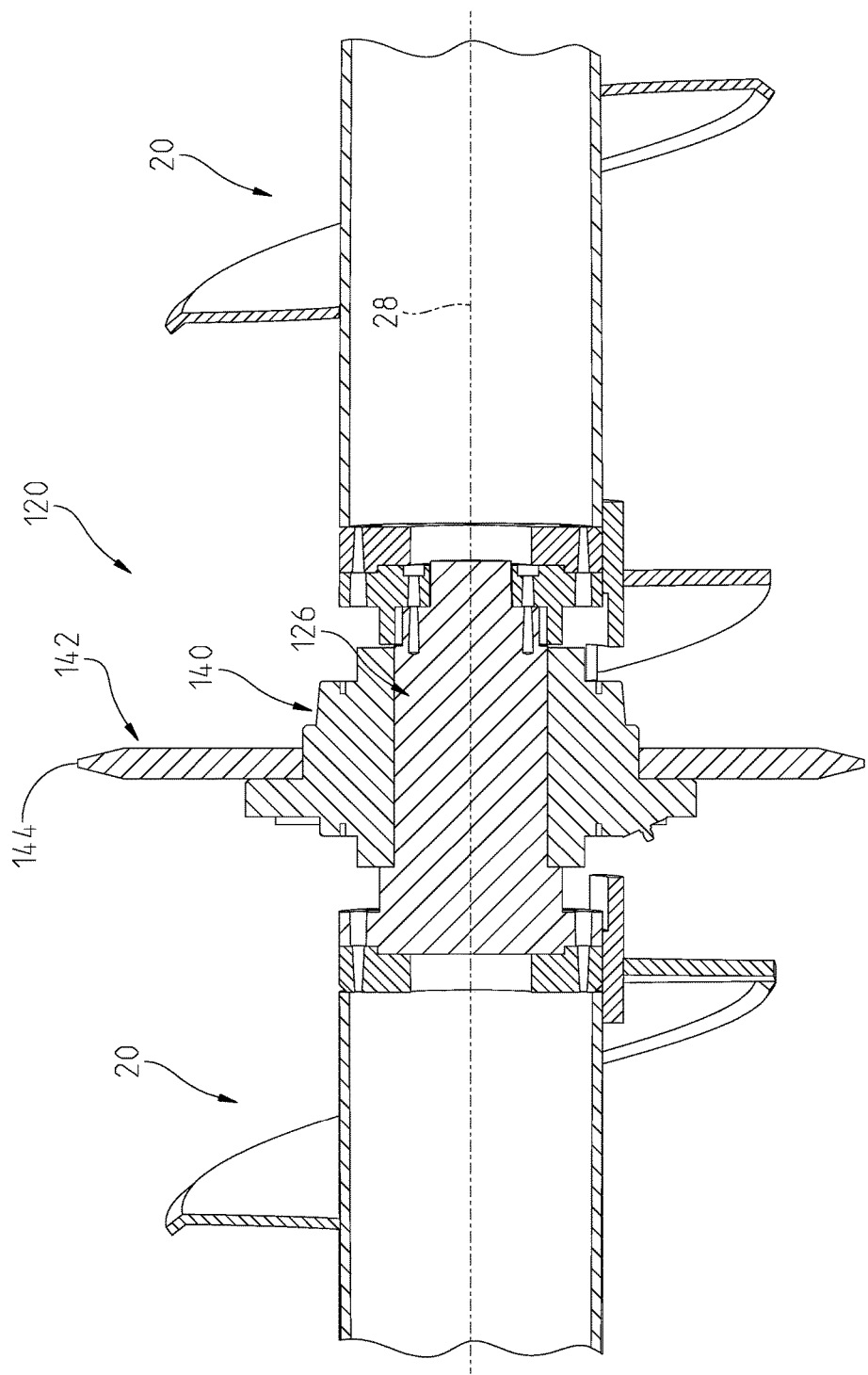
FIG. 12 is a section view 12-12 of the auger in FIG. 10.
Figure 13A:
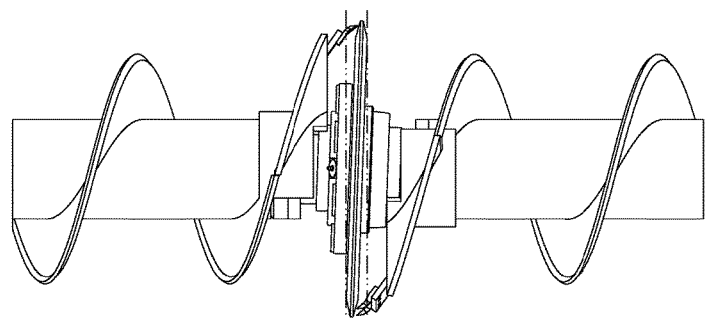
FIG. 13A is a front view of the auger in FIG. 8 at the starting position.
Figure 13B:
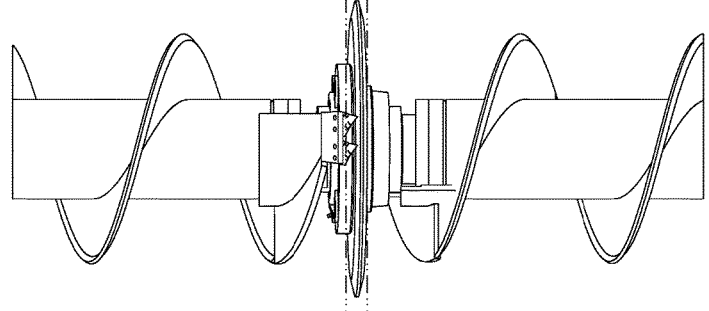
FIG. 13B is a front view of the auger in FIG. 8 at 90 degrees.
Figure 13C:
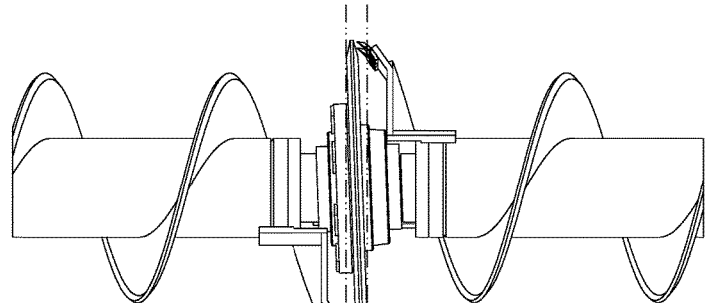
FIG. 13C is a front view of the auger in FIG. 8 at 180 degrees.
Figure 13D:
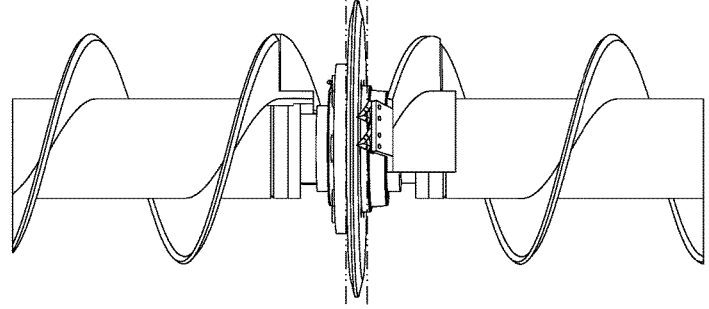
FIG. 13D is a front view of the auger in FIG. 8 at 270 degrees.
Figure 14:
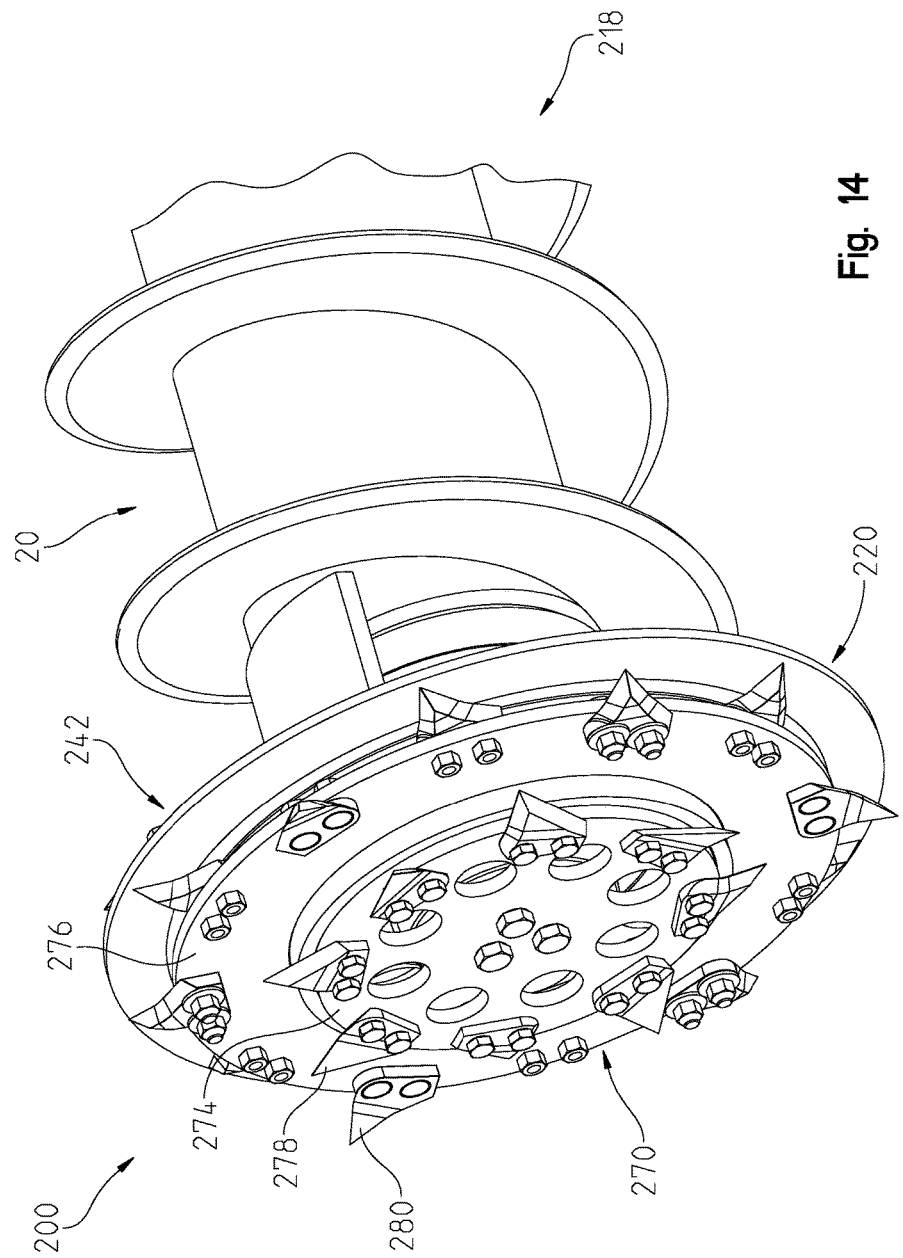
FIG. 14 is an isometric view of an auger using an oscillating auger end support wheel.
Figure 15:
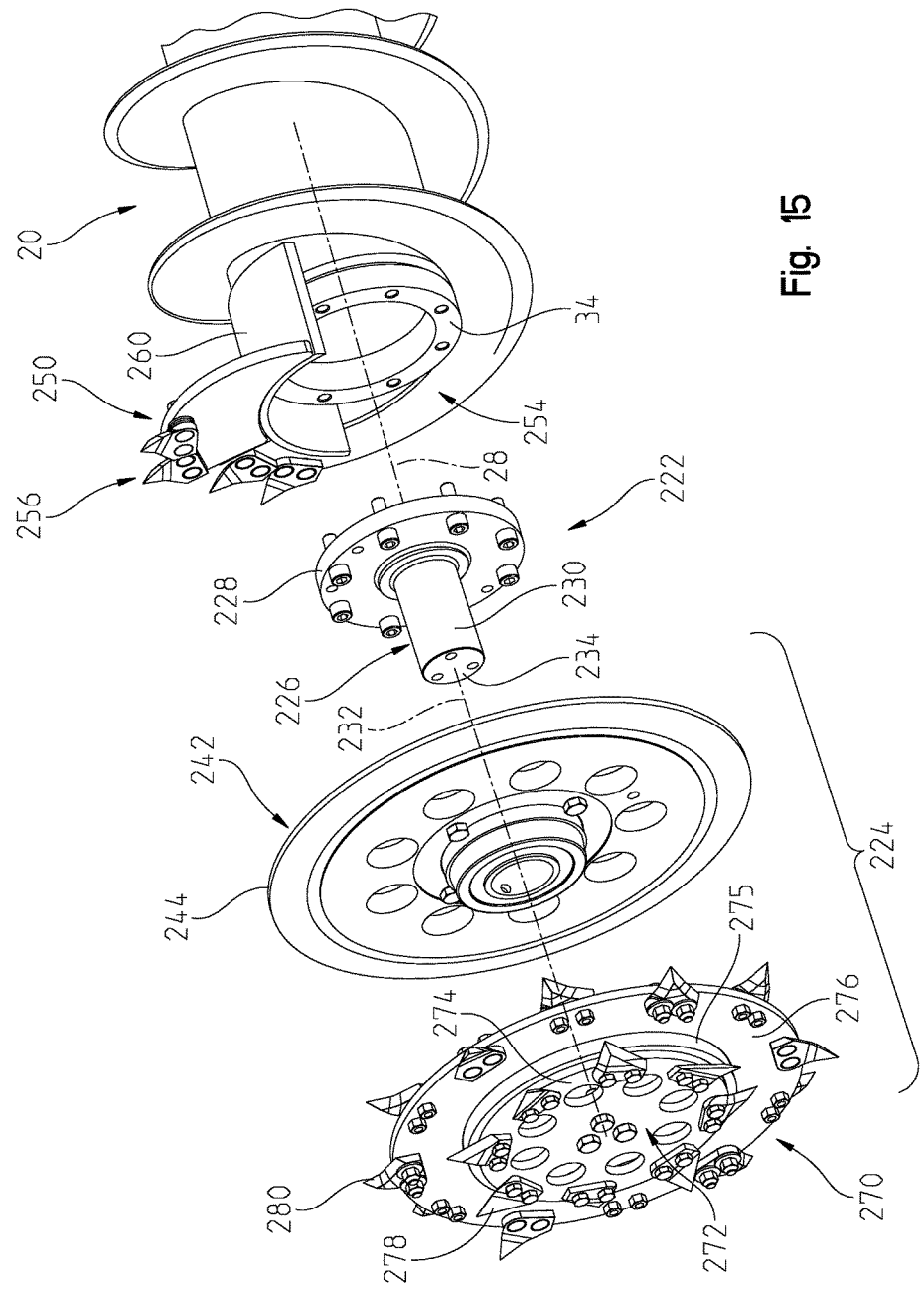
FIG. 15 is an isometric exploded view of the auger in FIG. 14.

The auger assembly 18 is commonly made up of individual augers 20, as shown in FIGS. 2 and 3. The auger 20 has a central shaft 22 and a flight 24 that helically encircles the central shaft 22. The flight 24 has an outside edge 26 that is located at a radial distance from a central axis 28 of the auger 20. The auger 20 rotates about the central axis 28 and the outside edge 26 forms a cutting diameter 30 that extends along the length of the auger 20 where the flight 24 is located. The cutting diameter 30 is located at a radial distance from the central axis 28 and that radial distance may change depending on the axial position along the central axis 28. It is contemplated that in some cases it may be desirable to have portions of the cutting diameter 30 be larger or smaller than other portions. In other words, varying the radial distance at corresponding axial locations may be used to produce augers 20 that are tapered or stepped in some sections along their length. The central shaft 22 has terminal ends 32, 34 where other components may be affixed. The flight 24 has ends 36, 38 that define the start and end of the effective cutting diameter 30. The auger assembly 18 commonly requires supports at intervals along its length between individual augers 20 and a support located at the end. The supports may be either a hanger 40 as shown in FIGS. 2 and 3, or support wheel 120 as shown in FIGS. 8 and 9. The support located at the end is commonly an oscillating end cutter 200.

The oscillating auger support hanger 40, as shown in FIGS. 2-7, is located between augers 20. The support hanger 40 has a mounting portion 44 that attaches to the support frame 19 that is located above and behind the auger 20, not shown in the drawings. The support hanger 40 has an auger coupler 46 that connects the augers 20 and allows them to rotate. The coupler 46 allows the transfer or torque from the auger 20 on one side of the support hanger 40 to the auger 20 on the other side. The mounting portion 44 has slots 48 that allow it to slide a certain distance along the length of the support frame 19. In other words, the slots 48 allow the mounting portion 44 to move in an axial direction with respect to the augers 20 and coupler 46 and with respect to the support frame 19 above. An auger support arm 50 is affixed to the mounting portion 44 that holds a first half 54 of the cam follower 52. The support arm 50 further includes an arcuate wall 51. The arcuate wall 51 provides rigidity. A second half 56 is bolted to the first half 54 to form the cam follower 52. The cam follower 52 (as assembled) has profile surfaces 60, 62. The cam follower 52 has a bearing 64 that is shown as a split bearing in FIG. 3. The bearing surface may be integral to the cam follower 52 or separate as shown. The bearings 64 are retained in the cam follower 52 and are held axially with an undercut 66. The bearing 64 allows the cam follower to move axially with respect to the augers 20 and move axially with respect to the coupler 46. The entire cam follower 52 with its profile surfaces 60, 62, the bearing 64, the support arm 50, and mounting portion 44 are adapted to shift together as a unit.

The bearing 64 supports a connection shaft 68 located on the auger coupler 46. The connection shaft 68 has a central axis 70 that is collinear with axis 28, and an outer bearing surface 72 that is concentric to the central axis 70. On each end of the outer bearing surface 72 are mounting flanges 76, 78 that attach to augers 20 at their corresponding terminal ends 32, 34. The mounting flanges 76, 78 have cams 80, 82 that interface with profile surfaces 60, 62 of the cam follower 52. As the augers 20 and connection shaft 68 rotate, the cams 80, 82 apply force to the profile surfaces 60, 62 that axially slide the cam follower 52 and mounting portion 44 with respect to the connection shaft 68 in an axial direction parallel to the central axis 70. The slots 48 in the mounting portion 44 allow the axial movement with respect to the frame that supports the mounting portion 44 from above the auger 20.

The cam follower 52 is shown with profile surfaces 60, 62 as outside planar surfaces that are angled with respect to the central axis 70, but it is contemplated that the connection shaft 68 has a cam follower that protrudes outwardly from the outer bearing surface 72 that would mate with an inside groove on the cam follower 52. It is further contemplated that the groove would be on the outer bearing surface 72 and the follower would be located on the cam follower 52. Other surfaces or mechanisms are also contemplated that would cause axial movement as the components rotate with respect to each other.

At each end of the augers 20, particularly at the end mounted to the mounting flanges 76, 78, have overhanging portions 90, 92 that extend beyond the mounting end of its corresponding auger 20. The overhanging portion 90 is shown on the left side auger 20 in FIG. 3 and overhanging portion 92 is shown on the right. The overhanging portion 90 has a flight portion 94 that begins where it meets the end of the flight 24 of the auger 20 and terminates in a synchronized cutter 96. As shown, these are separate parts, but it is contemplated that the flight 24 extends to the synchronized cutter 96. Due to the helical nature of the flight portion 94 and the fact that the synchronized cutter 96 defines the end of the flight portion 94 nearest the opposing auger 20, the cutter 96 defines the nearest part of flight 24 to the opposing auger 20. The remaining parts of the flight 24, other than the synchronized cutter 96, are helically located farther from the opposing auger 20. The overhanging portion 90 includes cutting knives 98 that are mounted radially on the flight portion 94. The overhanging portion 90 includes a guard 100. Similarly, overhanging portion 92 has a similar synchronized cutter 102 that defines the terminal end of the overhanging portion 92 with cutting knives 104 located on a flight portion 106 that overlays and is affixed to a guard 108. The knives 104 are located helically behind the synchronized cutter 102.

Figure 5:
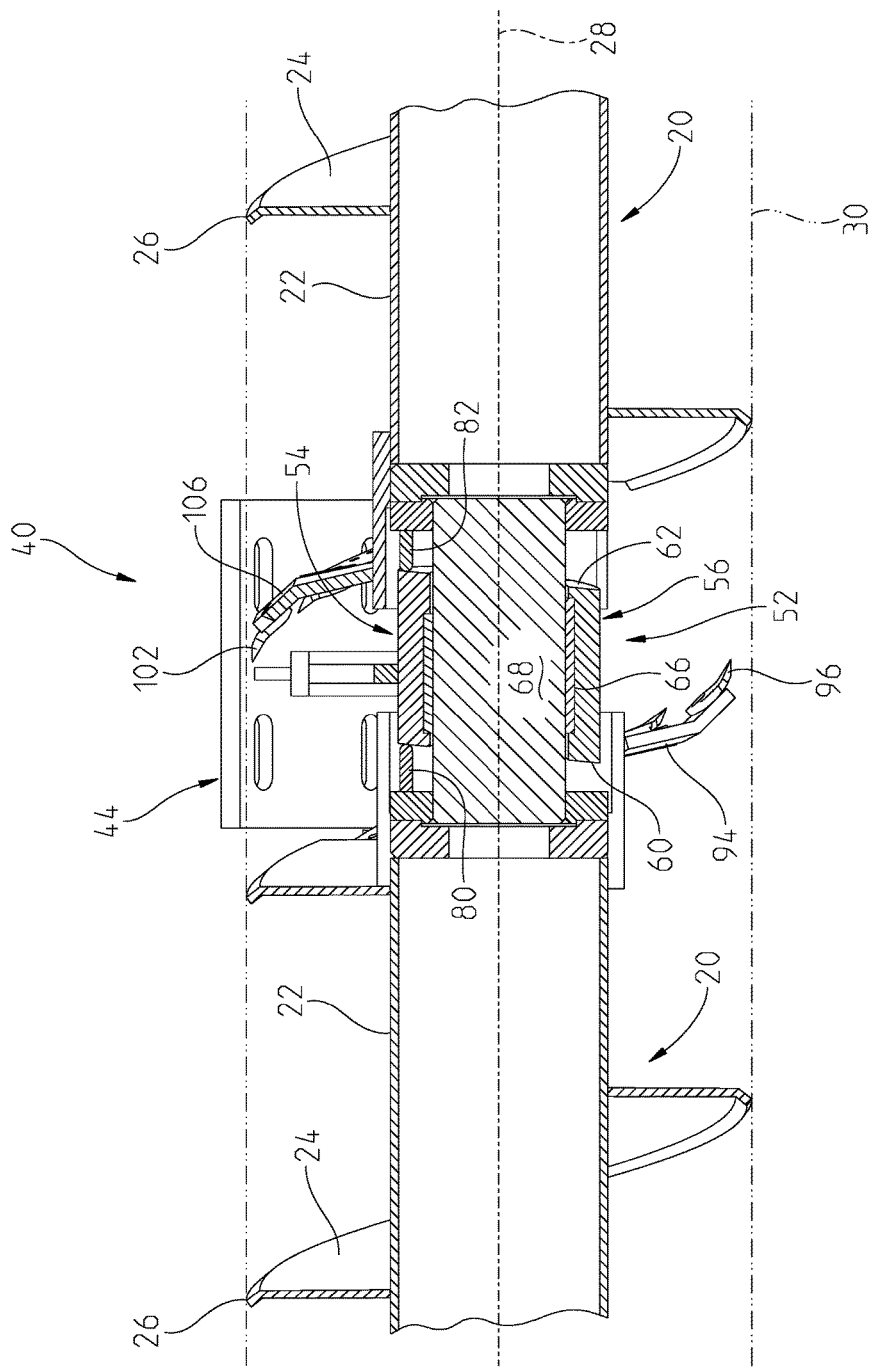
FIG. 5 is a section view 5-5 of the auger in FIG. 4.
Figure 7A:
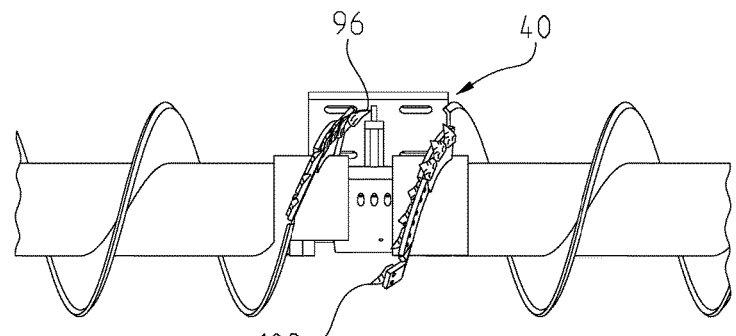
FIG. 7A is a front view of the auger in FIG. 2 at the starting position.
Figure 7B:
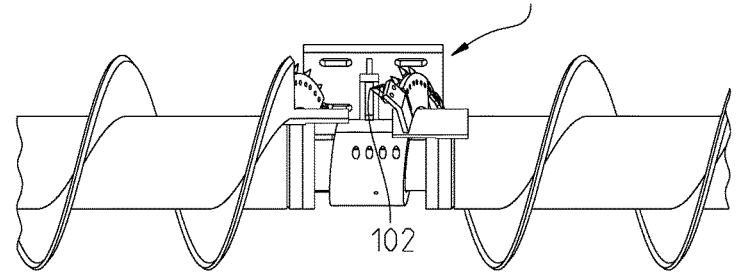
FIG. 7B is a front view of the auger in FIG. 2 at 90 degrees.
Figure 7C:
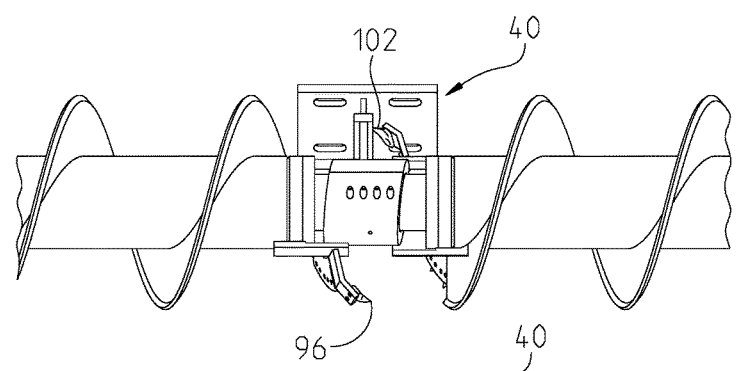
FIG. 7C is a front view of the auger in FIG. 2 at 180 degrees.
Figure 7D:
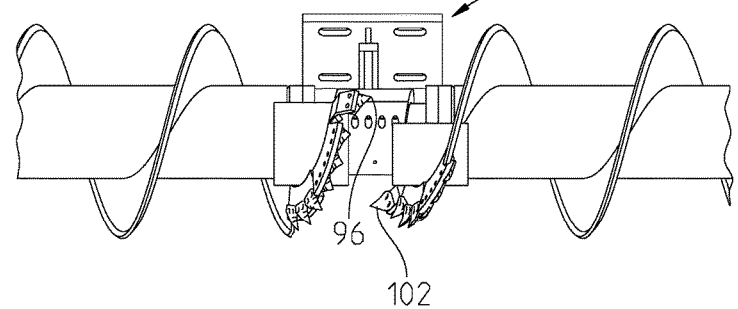
FIG. 7D is a front view of the auger in FIG. 2 at 270 degrees.

When the augers 20 are mounted to the hanger 40, the synchronized cutters 96, 102 may axially overlap. If they do not overlap, the distance between the cutters 96 and 102 is defined as a gap. The gap is commonly as small as possible and overlapping when possible. In the event the cutters 96 and 102 are overlapping, the gap is defined as negative. If the cutters 96, 102 are aligned, the gap is defined as a zero gap. As the augers 20 and connection shaft 68 rotate, the auger support arm 50 shuttles back and forth along the central axis 70. Because the synchronized cutters 96, 102 are diametrically opposed and the support arm 50 is thinner than the amount of axial movement of the cam follower 52, the support arm 50 moves out of the way for each synchronized cutter 96, 102. The support arm 50 has a thickness that is larger than any gap between the cutters 96 and 102. The gap is shown in FIG. 5 where cutter 96 is located near or at the same point along the axis 28 as cutter 102. As shown, the cutters 96, 102 are diametrically opposed, but this is not required. The synchronized cutters 96, 102 have to be spaced apart diametrically enough in conjunction with the cam follower 52 and cams 80, 82 to provide clearance for the support arm 50 as the augers 20 rotate and the hanger 40 shuttles back and forth in an axial direction. The movement of the support arm 50 as the augers 20 rotate is demonstrated in FIGS. 7A-7D, which show how the support arm 50 and entire hanger 40 move between first and second extreme positions. FIG. 7A shows the support arm 50 moved to the first extreme position to provide clearance for synchronized cutter 96. FIG. 7B shows the support arm 50 at a midpoint where it is located between the cutters 96, 102. FIG. 7C shows the support arm 50 moved to the second opposite extreme position to provide clearance for synchronized cutter 102. In this manner, the shuttling of the hanger 40 allows the support arm 50 to axially move out of the way of synchronized cutters 96, 102.

The auger assembly 118 may utilize an oscillating mid-auger support wheel 120, shown in FIGS. 8-13. As with the oscillating auger support hanger 40, the support wheel 120 is located between augers 20. The support wheel 120 supports the weight of the augers 20 and keeps them supported above the floor 12 on which the wheel 120 rides. The support wheel 120 has a connection shaft portion 122 and an oscillating portion 124. The connection shaft portion 122 has an angled shaft 126 with a mounting flange 128 and a bearing surface 130 that is concentric with an angled axis 132 of the angled shaft 126. Once affixed to the augers 20, the angled axis 132 is angled with respect to the central axis 28 of the augers 20. Opposite the mounting flange 128 is a shaft flange 134 that affixes to the angled shaft 126. The shaft flange 134 and mounting flange 128 define the boundaries of the bearing surface 130. The mounting flange 128 and shaft flange 134 allow augers 20 to be affixed through the support wheel 120 and allow rotation of one auger 20 to rotate the other auger 20. A support wheel bearing 140 encircles the angled shaft 126 where it rides on the bearing surface 130. The support wheel bearing 140 is constrained axially by the flanges 128, 134 and allows rotation about the angled axis 132. Affixed to the support wheel bearing 140 is an auger support wheel 142. As shown, the support wheel 142 is a flat disc with an outside diameter surface 144. The support wheel 142 is affixed to the support wheel bearing 140 through bolts, fasteners, or other components or methods that may include welding, riveting, or pressing. The outside diameter surface 144 contacts the floor 12 when the auger assembly 118 is installed in a storage structure 10.

The angled axis 132 is angled with respect to axis 28 of the augers 20 and mounting flanges 128, 134. Because it is angled, rotation of the augers 20 and shaft 126 causes the auger support wheel 142 to sweep or wobble back and forth in an oscillating pattern. As shown, the auger support wheel 142 freewheels with respect to the angled shaft 126, but it is contemplated that it is fixed or a friction component is implemented that allows rotation and provides torque to the auger support wheel 142.

At each end of the augers 20, particularly at the ends mounted to the flanges 128, 134, are overhanging portions 150, 152 that extend beyond the mounting end of its corresponding auger 20. The overhanging portion 150 has a flight portion 154 that begins where it meets the end of the flight 24 of the auger 20 and terminates in a synchronized cutter 156. As shown, the start of the flight portion 154 has a diameter that matches the diameter of the flight 24 and then increases to a larger diameter as it extends toward the synchronized cutter 156. This is visible in FIG. 10. The larger diameter approaches the diameter of the support wheel 142. As shown, these are separate parts, but it is contemplated that the flight 24 extends to the synchronized cutter 156. The overhanging portion 150 may include cutting knives that are mounted radially on the flight portion 154. The overhanging portion 150 includes a guard 160. Similarly, overhanging portion 152 has a similar synchronized cutter 158 with optional cutting knives located on a flight portion and a corresponding guard 162.

When the augers 20 are mounted to the support wheel 142, the synchronized cutters 156, 158 may overlap along the central axis 28. If they do not overlap, the distance between the cutters 156 and 158 is defined as a positive gap. Any overlap is defined as a negative gap. A zero gap occurs when the cutters 156 and 158 are located at the same axial position on the central axis 28 to define a zero gap. The gap is commonly as small as possible and overlapping when possible. As the augers 20 and shaft 126 rotate, the auger support wheel 142 oscillates back and forth in a wobbling motion. The amplitude of the wobbling motion is commonly greater than the thickness of the support wheel 142. The support wheel 142 is thicker than any gap between cutters 156 and 158. Because the synchronized cutters 156, 158 are diametrically opposed and the auger support wheel 142 is thinner than the amount of wobble, it allows each synchronized cutter 156, 158 to overlap along the axis 28. In other words, the synchronized cutters 156, 158 intersect a plane that is perpendicular to the central axis of the auger and located at the center position of the support wheel. As shown, the cutters 156, 158 are diametrically opposed, but this is not required. The synchronized cutters 156, 158 must be spaced apart diametrically enough so that in conjunction with the amount of oscillation, there is sufficient clearance for the support wheel 142 to be located between the cutters 156, 158 while allowing them to axially overlap.

Adjacent the terminal end of the augers 20 and at the root of the overhanging portions 150, 152 are shields 160, 162. The shields 160,162 protect portions of the shaft 126 and support wheel bearing 140 where the conveyed material can become impacted or contaminate the bearing 140 and shaft 126.

Figure 16:
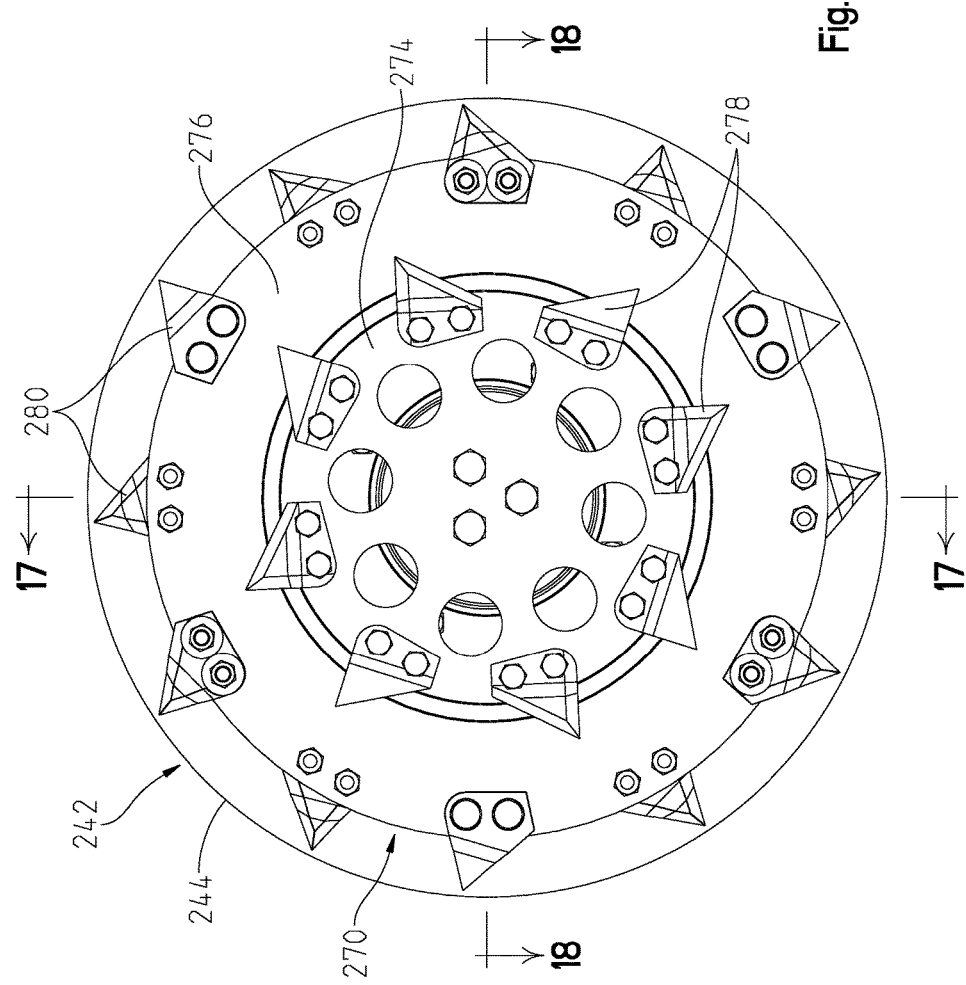
FIG. 16 is an end view of the auger in FIG. 14.
Figure 17:
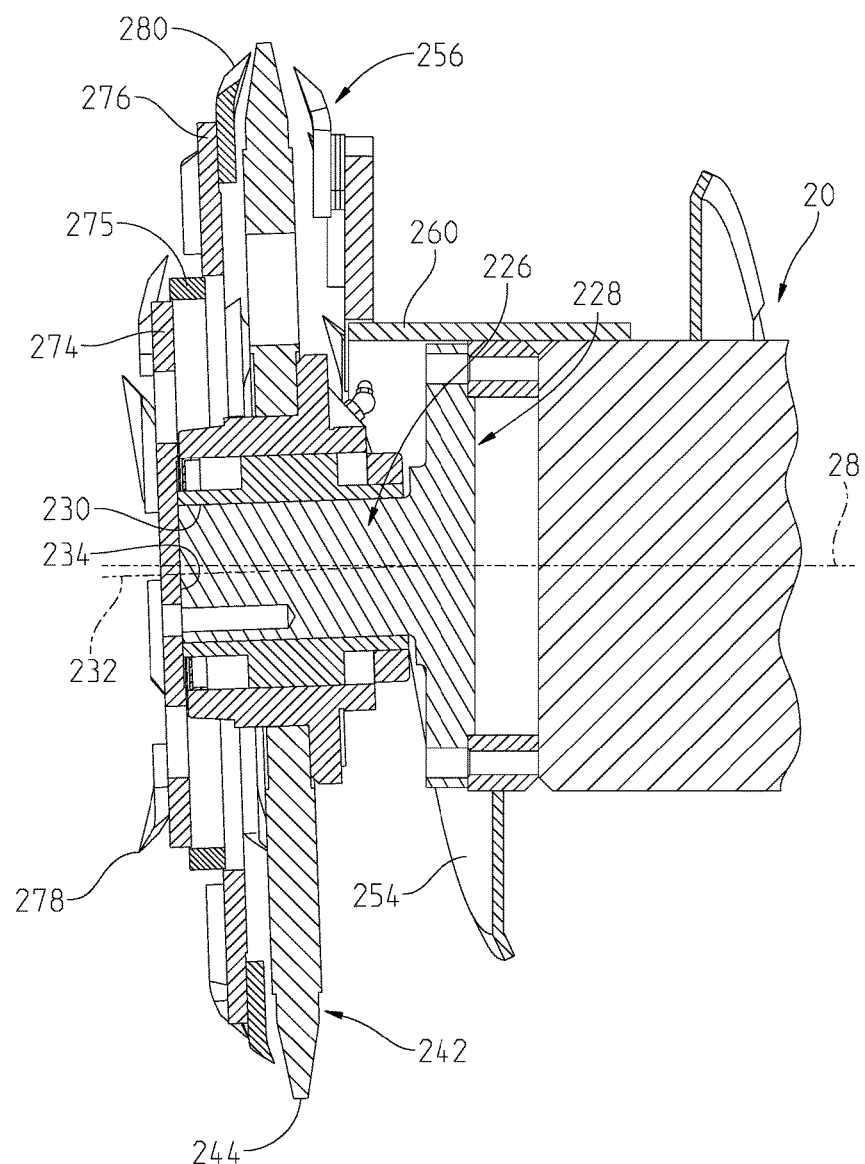
FIG. 17 is a section view 17-17 of the cutter in FIG. 16.
Figure 18:
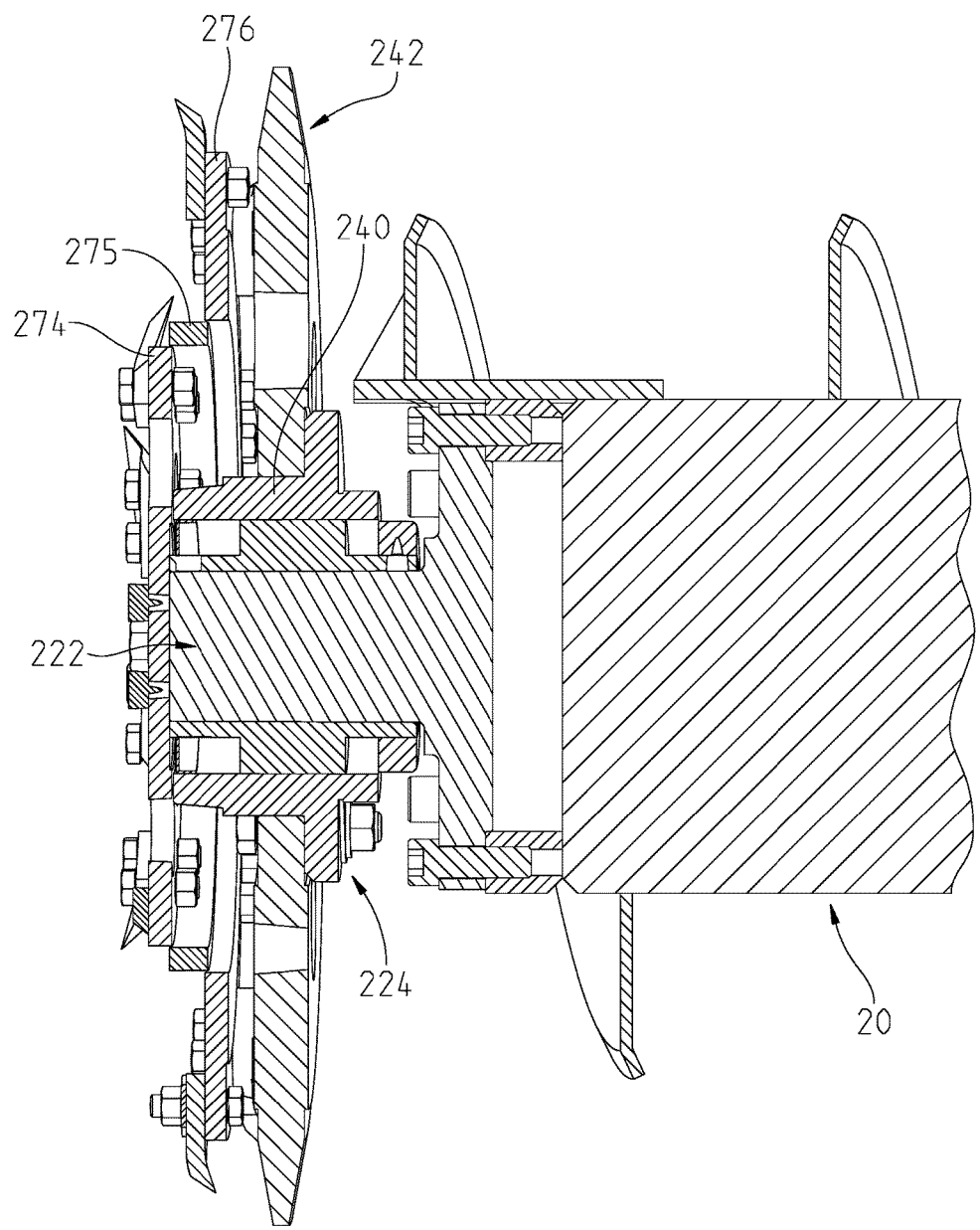
FIG. 18 is a section view 18-18 of the cutter in FIG. 16.
Figure 19A:
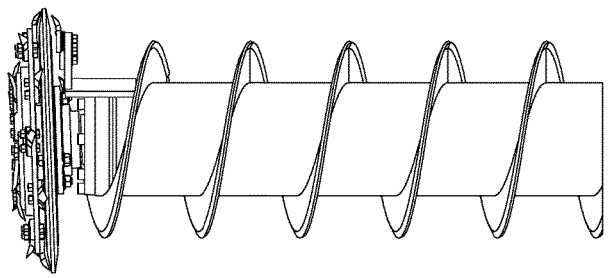
FIG. 19A is a front view of the cutter in FIG. 14 at the starting position.
Figure 19B:
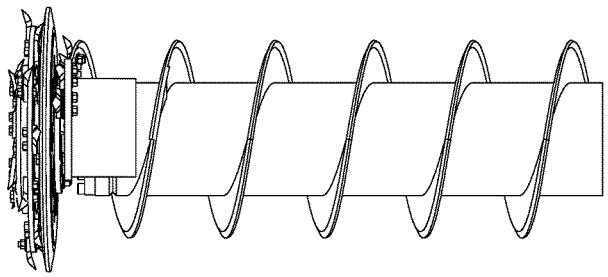
FIG. 19B is a front view of the cutter in FIG. 14 at 90 degrees.
Figure 19C:
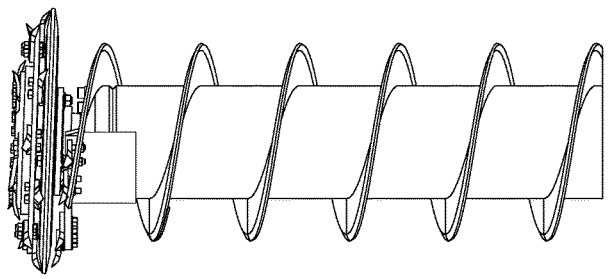
FIG. 19C is a front view of the cutter in FIG. 14 at 180 degrees.
Figure 19D:
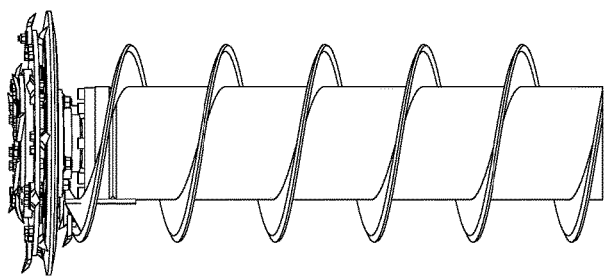
FIG. 19D is a front view of the cutter in FIG. 14 at 270 degrees.

An oscillating auger end support wheel 200, 202, 204, 206, shown in FIGS. 14-22, shares many of the same features and components as the oscillating mid auger support wheel 120, shown in FIGS. 8-13. The auger assembly 218 may utilize an oscillating support wheel 220, shown in FIG. 14. The oscillating support wheel 220 is located at the terminal end of the auger 20. The oscillating support wheel 220 supports the weight of the end of the auger 20 and keeps it suspended above the floor 12. The oscillating support wheel 220 has a shaft portion 222 and an oscillating portion 224. The shaft portion 222 has an angled shaft 226 with a mounting flange 228 and a bearing surface 230 that is concentric with an angled axis 232 of the angled shaft 226. The mounting flange 228 is affixed to the end of the auger 20, shown in FIG. 17. Once affixed to the end of the auger 20, the angled axis 232 is angled with respect to the central axis 28 of the augers 20. Opposite the mounting flange 228 is an end flange 134 that affixes to the angled shaft 226. The end flange 234 and mounting flange 228 define the boundaries of the bearing surface 230. The mounting flange 228 and end flange 234 allow a rotary cutter 270 to be affixed. A support wheel bearing 240 encircles the angled shaft 226 where it rides on the bearing surface 230. The support wheel bearing 240 is constrained axially by the flange 228 and end flange 234 and allows rotation about the angled axis 232. Affixed to the support wheel bearing 240 is an auger support wheel 242. As shown in FIGS. 16 and 17, the support wheel 242 is a flat disc with an outside diameter surface 244. The support wheel 242 is affixed to the support wheel bearing 240 through bolts, fasteners, or other components or methods that may include welding, riveting, or pressing. The outside diameter surface 244 contacts the floor 12 when the auger assembly 218 is installed in a storage structure 10.

The angled axis 232 is angled with respect to the augers 20 and flanges 228, 234. Because it is angled, rotation of the augers 20 and shaft 226 causes the auger support wheel 242 to sweep back and forth in an oscillating pattern. As shown, the auger support wheel 242 freewheels with respect to the angled shaft 226, but it is contemplated that it is fixed or a friction component is implemented that allows rotation and provides torque to the auger support wheel 242.

At the end of the auger 20, particularly at the end where the end support 200 is affixed, is an overhanging portion 250 that extends beyond the mounting end of the auger 20. The overhanging portion 250 has a flight portion 254 that begins where it meets the end of the flight 24 of the auger 20 and terminates in a synchronized cutter 256. The start of the flight portion 254 matches the diameter of the flight 24 and then increases to a larger diameter as it extends toward the synchronized cutter 256. As shown, these are separate parts, but it is contemplated that the flight 24 extends to the synchronized cutter 256. The overhanging portion 250 may include cutting knives that are mounted radially on a flight portion 254. The overhanging portion 250 includes a guard.

When the support wheel 242 is attached to the auger 20, the synchronized cutter 256 axially overlaps portions of the support wheel 242. As the auger 20 and shaft 226 rotates, the auger support wheel 242 oscillates back and forth in a wobbling motion. Because the synchronized cutter 256 is diametrically opposed to the portion of the auger support wheel that is closest to the auger, it allows the synchronized cutter 156 to overlap along the axis 28. The synchronized cutter 256 has to be located in conjunction with the amount of oscillation to provide clearance for the support wheel 242 while allowing it to axially overlap. Adjacent the terminal end of the auger 20 and at the root of the overhanging portion 250 is a shield 260. The shield protects a portion of the shaft 226 and support wheel bearing 240 where dry granular material can become impacted or contaminates the bearing 240 and shaft 226.

The end support 200 includes the rotary cutter 270 that is fixed to and rotates with the angled shaft 226. The rotary cutter 270 has a mounting portion 272 that has a minor diameter 274 and a major diameter 276 where cutting elements 278, 280 are affixed. The major diameter 276 is affixed to the minor diameter 274 with an offset wall 275. It is contemplated that the cutting elements 278, 280 are attached to a rotary cutter where the minor diameter 274 and major diameter 276 are integral. As the rotary cutter 270 rotates, the oscillation and cutting elements 278, 280 break up any material as the auger moves through material to be conveyed by the auger.

Figure 20:
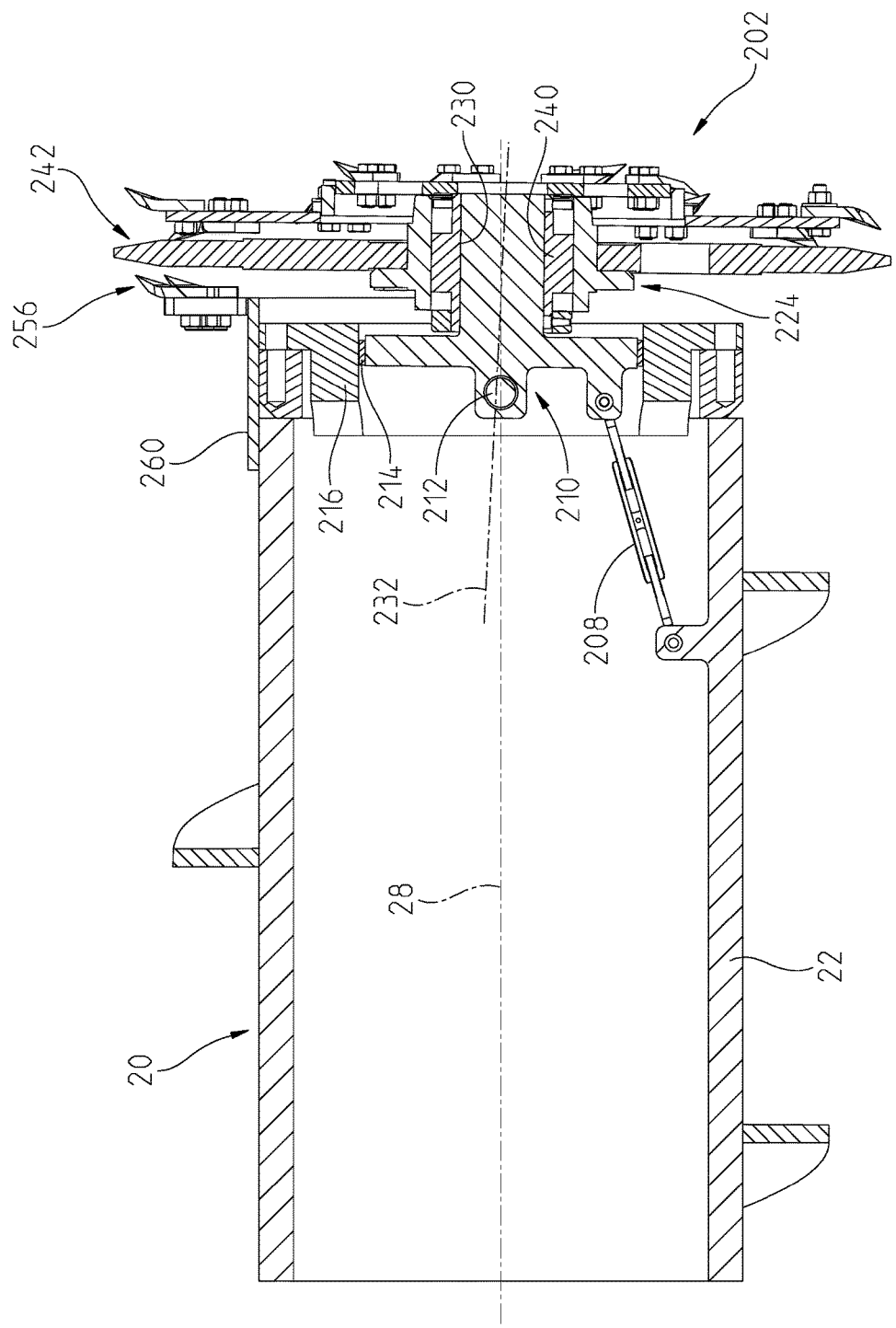
FIG. 20 is a section view 17-17 of a manually adjustable cutter embodiment.
Figure 21:
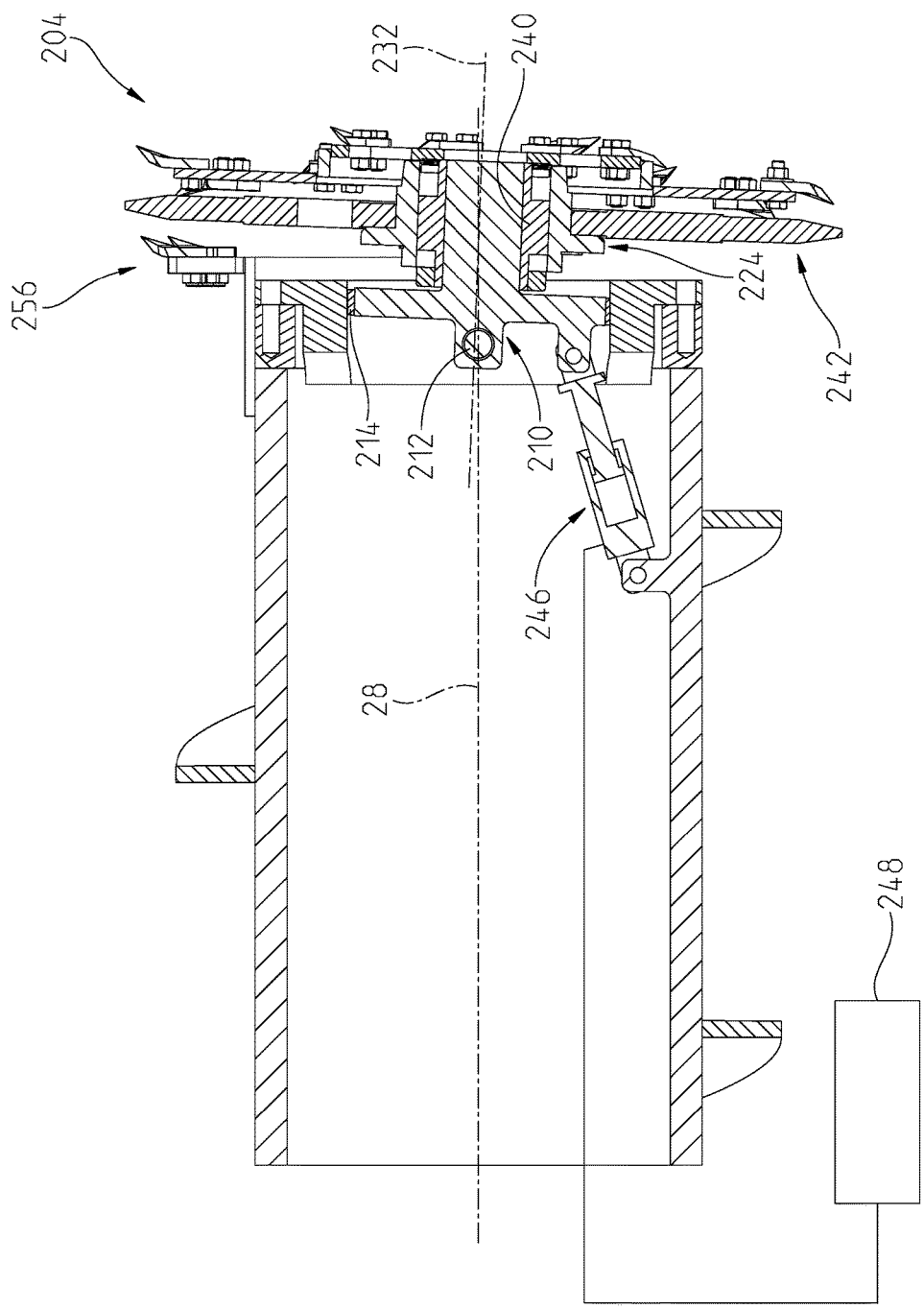
FIG. 21 is a section view 17-17 of a powered adjustable cutter embodiment.
Figure 22:
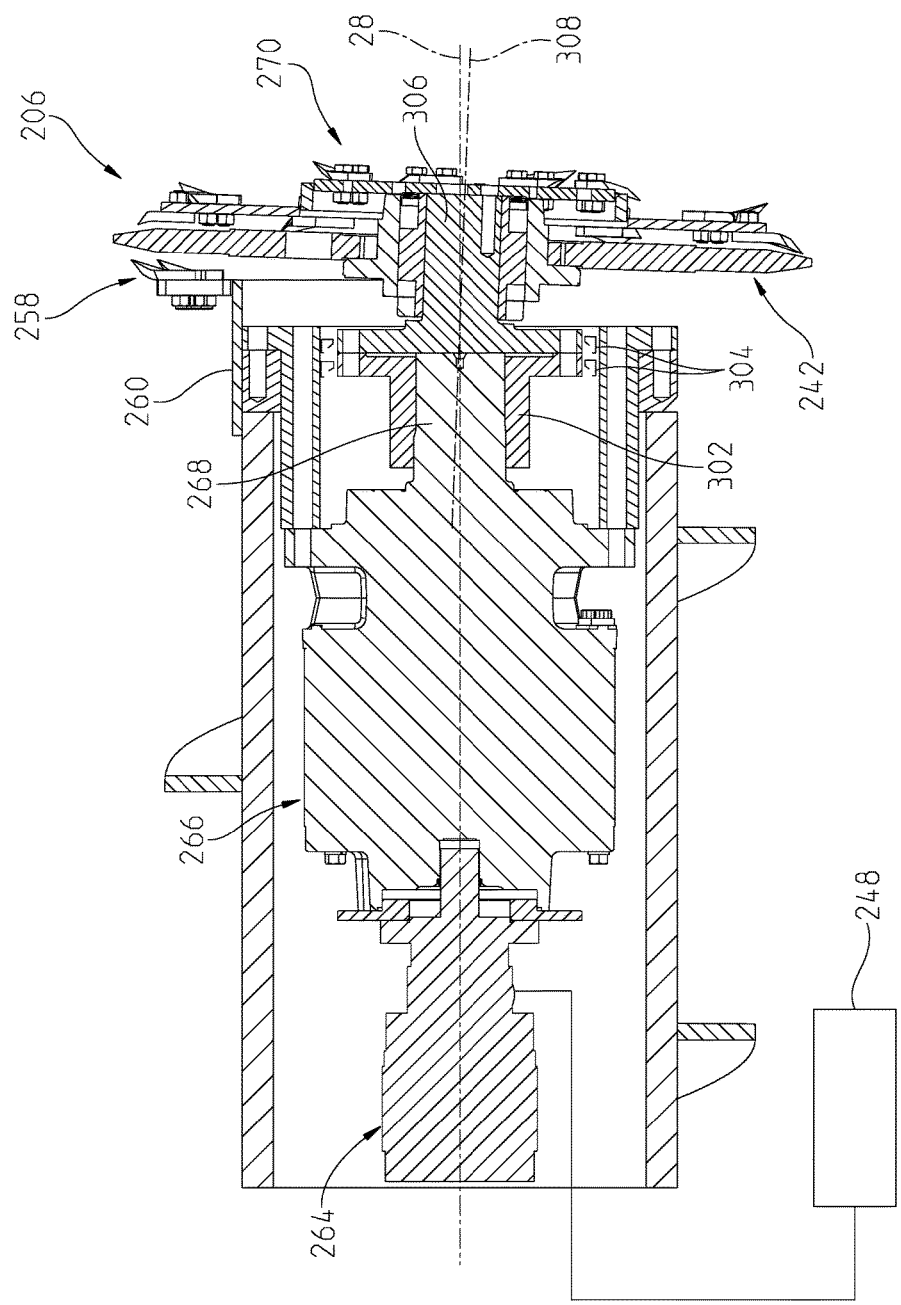
FIG. 22 is a section view 17-17 of a powered end cutter embodiment.

Alternate end supports are shown in FIGS. 20-22. For example, the user may desire to adjust the amount of wobble of the support wheel 242, as shown in FIG. 20, manually using the manual adjustable end support 202. A manual adjuster 208 connects at one end to the shaft 22 and at the other end to a pivoting shaft portion 210. The pivoting shaft portion 210 shares many features with the shaft portion 222 but is movable with respect to the auger 20. The shaft portion 210 can rotate about a pivot point 212 to modify the angle of the angled axis 232. The pivoting shaft portion 210 has a seal 214 where it seals to the auger 20, particularly the mounting portion 216. The wheel bearing 240 allows the support wheel 242 to rotate about the angled axis 232. The synchronized cutter 256 remains fixed with respect to the auger 20. A powered adjustable end support 204 is shown in FIG. 21. In this embodiment, the manual adjuster 208 is replaced with a powered adjuster 246 that is controlled hydraulically, electrically, or mechanically with a controller 248.

A powered end support 206 is shown in FIG. 22. The support 206 is driven by a motor 264 that is attached to a gearbox 266. The motor 264 may be hydraulic, electric, or pneumatic. The gearbox 266 may or may not be required, based on the torque and speed capabilities of the motor 264. The motor 264, driven by a controller 248, rotates an output shaft 268 that is connected to a mounting flange 302. The mounting flange 302 is sealed to the auger 20 with a seal 304. The seal 304 allows rotation of the mounting flange 302 while keeping debris from passing through. Attached to the mounting flange 302 is an angled shaft 306. The angled shaft 306 has an angled axis 308 that is angled with respect to the central axis 28 of the auger 20. The angled shaft 306 is also sealed to the auger 20 with a corresponding seal 304 to prevent debris intrusion. The angled shaft 306 rotates with the output shaft 268 to create oscillation that it is independent of the rotation of the auger 20. When the motor 264 is not rotating, the powered end support 206 functions the same as the end support 200. Because the rotation of the angled shaft 306 is not necessarily locked to the rotation of the auger 20, the position of the support wheel 242 may be close to or far away from the cutter 258 as the motor 264 rotates the angled shaft 306. The support wheel 242 is shown at a far distance in FIG. 22. Rotating the angled shaft 306 180 degrees would cause the angled axis 308 to be angled oppositely and place the support wheel in close proximity to the cutter 258. Therefore, the cutter 258 must be set back far enough to allow the oscillation of the support wheel without the two contacting each other.

Figure 23:
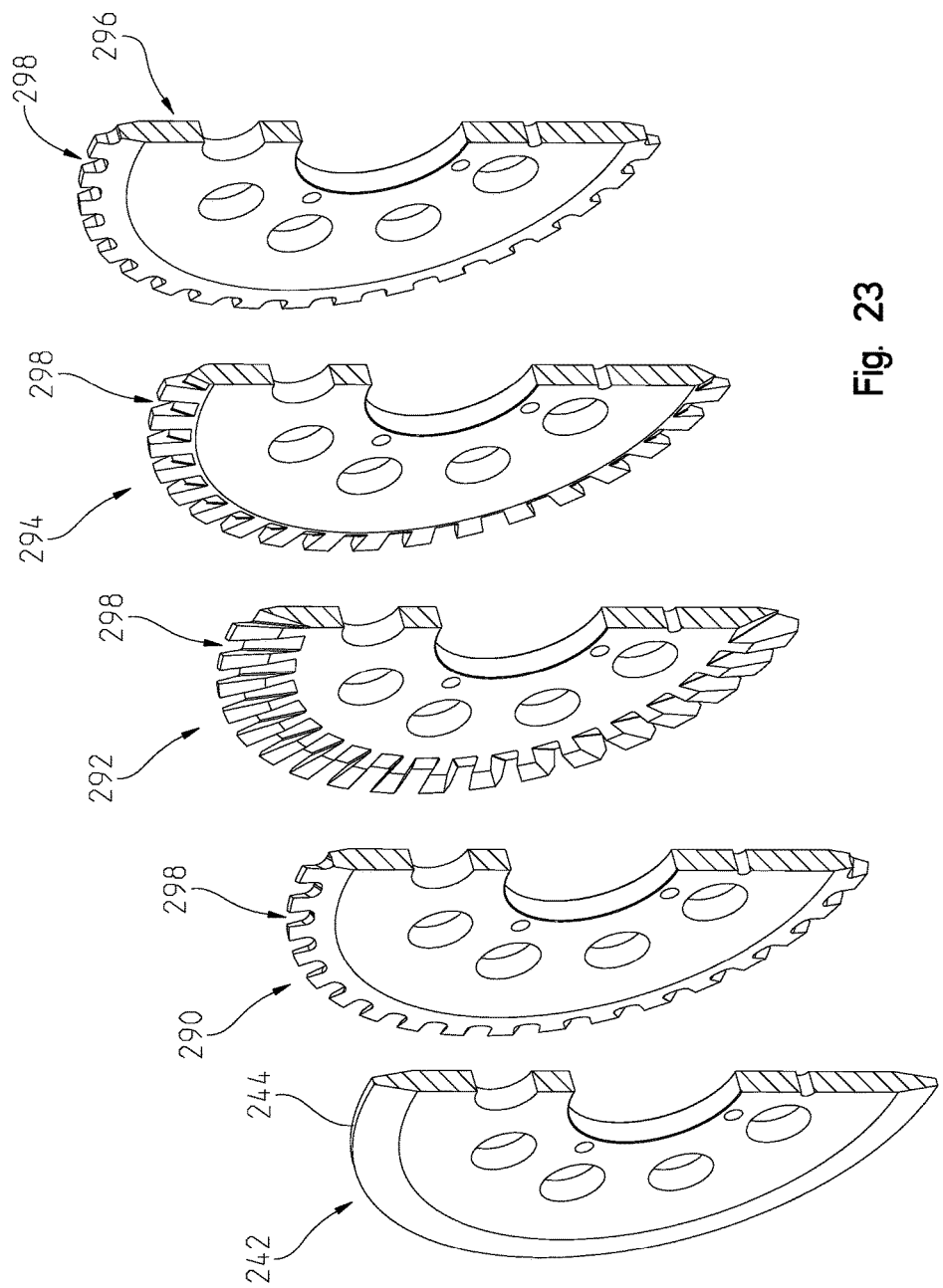
FIG. 23 is an isometric view of alternate support wheel embodiments.

As shown in the mid-auger support 118 with a support wheel 142 and the end support 200, 202, 204, 206 uses support wheel 242, alternate support wheels 290, 292, 294, 296 are contemplated, such as shown in FIG. 23. These alternate support wheels have an effective diameter that matches the outside diameter surface 244. By adding notches 298, the support wheel 142 cuts through impacted material as it presses into and rotates against it.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An auger system adapted for use in a storage area having a floor, said auger system comprising:
a first elongate auger rotatable about a central axis, said first auger having a first central shaft concentric with said central axis and having a first terminal end, said first auger having a first flight helically encircling said first central shaft, said first flight having an outside edge located at a first radial distance from said first central axis, a portion of said first flight extending along said first central axis beyond said first terminal end and terminating at a first synchronized cutter;
a second elongate auger rotationally affixed to said first elongate auger;
said second elongate auger rotatable about a second central axis, said second auger having a second central shaft concentric with said first central axis and having a second terminal end, said second auger having a second flight helically encircling said second central shaft, said second flight having an outside edge located at a second radial distance from said second central axis, a portion of said second flight extending along said central axis beyond said second terminal end and terminating at a second synchronized cutter;
said first synchronized cutter spaced along said central axes from said second synchronized cutter by a gap distance; and
a support located between said first and said second synchronized cutters, said support having a width being greater than said gap distance, said elongate augers rotatable with respect to said support.

2. The auger system of claim 1, wherein said support is a support bearing having a bearing shaft with a bearing axis, said bearing shaft affixed to and located between said first and said second terminal ends of said first and said second elongate augers, said support bearing having a shuttling bearing carrier encircling a portion of said bearing shaft to facilitate rotation of said bearing shaft and said shuttling bearing carrier being axially moveable with respect to said bearing shaft, said shuttling bearing carrier having a first profile surface, said bearing shaft having a first cam rotating therewith, said first cam adapted to contact said first profile surface, said first cam and said first profile surface cooperating to axially move said bearing carrier with respect to said bearing shaft.

3. The auger system of claim 2, wherein said shuttling bearing carrier moves axially along said central axis when said bearing shaft rotates, said shuttling bearing carrier including an auger support arm affixed thereto, and said auger support arm being located between said synchronized cutters.

4. The auger system of claim 3, wherein said first and second synchronized cutters axially overlap along said central axis to define a negative said gap distance and said axial movement of said shuttling bearing locating said support arm so that it does not contact said synchronized cutters.

5. The auger system of claim 1, wherein said support includes an angled shaft affixed to said augers between said first terminal end and said second terminal end to rotatably affix said first auger to said second elongate auger, said angled shaft having an angled axis obliquely angled with respect to said first and second central axes of said augers, a support wheel having an outside diameter concentric with said angled axis of said angled shaft, said support wheel rotatable with respect to said angled shaft about said angled axis, and said outside edges of said first and second flights are at a distance from said floor, said distance remaining substantially constant when said elongate auger rotates about said first and second central axes.

6. The auger system of claim 5, wherein said first and second synchronized cutters are located at a greater radial distance from said first and second central axes than said outside edges of said first and second flights.

7. The auger system of claim 5, wherein said first synchronized cutter overlaps axially with said second synchronized cutter to define a negative said gap distance.

8. The auger system of claim 5, wherein said first radial distance increases radially toward said first synchronized cutter and said second radial distance increases radially toward said second synchronized cutter.

9. An auger system adapted for use in a storage area having a floor, said auger system comprising:
a first elongate auger rotatable about a central axis, said first auger having a first central shaft concentric with said central axis and having a first terminal end, said first auger having a first flight helically encircling said first central shaft, said first flight having an outside edge located at a first radial distance from said first central axis, a first portion of said first flight extending along said central axis beyond said first terminal end;
a second elongate auger rotatable about said central axis, said second auger having a second central shaft concentric with said central axis and having a second terminal end, said second auger having a second flight helically encircling said second central shaft, said second flight having an outside edge located at a second radial distance from said central axis, a second portion of said second flight extending along said central axis beyond said second terminal end;
said first terminal end facing said second terminal end; and
a support bearing having a bearing shaft with a bearing axis, said bearing shaft affixed to and located between said first and said second terminal ends of said first and said second elongate augers, said support bearing having a shuttling bearing carrier encircling a portion of said bearing shaft to facilitate rotation said shuttling bearing carrier having a first profile surface, said bearing shaft having a first cam rotating therewith, said first cam adapted to contact said first profile surface, said first cam and said first profile surface cooperating to axially move said bearing carrier with respect to said bearing shaft.

10. The auger system of claim 9, wherein said first portion of said first flight is spaced along said central axis from said second portion of said second flight by a gap distance; and said support located between said first and second flights having a width being greater than said gap distance.

11. The auger system of claim 9, wherein said portions of said first and second flights axially overlap along said central axis.

12. The auger system of claim 9, wherein said first profile surface is planar and obliquely angled with respect to said bearing axis.

13. An auger system adapted for use in a storage area having a floor, said auger system comprising:
an elongate auger rotatable about a central axis, said auger having a central shaft concentric with said central axis and having a terminal end, said auger having a flight helically encircling said central shaft, said flight having an outside edge located at a radial distance from said central axis, a portion of said flight extending along said central axis beyond said terminal end;
an angled shaft affixed to said auger at said terminal end, said angled shaft having an angled axis obliquely angled with respect to said central axis;
a support wheel having an outside diameter and being rotatable with respect to said angled shaft about said angled axis, said outside diameter being concentric with respect to said angled axis; and
said outside edge of said flight is at a distance from said floor at corresponding axial locations of said edge, said distance remaining substantially constant at said corresponding axial locations when said elongate auger rotates about said central axis.

14. The auger system of claim 13, further comprising:
a second elongate auger rotatable about said central axis, said second auger having a second central shaft concentric with said central axis and having a second terminal end, said second auger having a second flight helically encircling said second central shaft, said second flight having a second outside edge located at a second radial distance from said central axis, a portion of said second flight extending along said central axis beyond said second terminal end;
said outside edge of said flight is at a distance from said floor at corresponding axial locations of said edge, said distance remaining substantially constant at said corresponding axial locations when said elongate auger rotates about said central axis;
a first synchronized cutter affixed to said first central shaft and helically extending beyond said terminal end, a second synchronized cutter affixed to said second central shaft and helically extending beyond said second terminal end, said first and second synchronized cutters located at a radial distance from said central axis greater than said outside edges of said first and second flights.

15. The auger system of claim 14, further comprising a first synchronized cutter affixed to an end of said first flight and a second synchronized cutter affixed to an end of said second flight, said first synchronized cutter overlapping axially with said second synchronized cutter.

16. The auger system of claim 14, further comprising a first synchronized cutter affixed to an end of said first flight and a second synchronized cutter affixed to an end of said second flight, said first synchronized cutter overlapping axially with said second synchronized cutter, said first synchronized cutter spaced along said central axis from said second synchronized cutter by a gap distance; and said support wheel having a width being greater than said gap distance.

17. The auger system of claim 13, further comprising a first cutter affixed adjacent to said support wheel on one side of said support wheel, a second cutter affixed adjacent to another side of said support wheel opposite said first cutter, said wheel being located axially between said first and said second cutters, said first and second cutters rotating with said auger.

18. The auger system of claim 17, wherein said first and second cutters located at a radial distance from said central axis greater than said outside edge of said flight.

19. The auger system of claim 17, wherein said first cutter overlaps axially with said second cutter.

20. The auger system of claim 17, wherein said first cutter spaced along said central axis from said second cutter by a gap distance; said gap distance narrower than said wheel.

\* \* \* \* \*